US010575386B2

(12) United States Patent
Fournier et al.

(10) Patent No.: US 10,575,386 B2
(45) Date of Patent: Feb. 25, 2020

(54) ACCENT LIGHTS WITH JUNCTION BOX CONTROLLER

(71) Applicant: Hayward Industries, Inc., Berkeley Heights, NJ (US)

(72) Inventors: Gregory Fournier, West Kingston, RI (US); Kevin Potucek, Far Hills, NJ (US); James Murdock, Wakefield, RI (US); Steven Mitchell, Chepachet, RI (US); James Carter, Warren, RI (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

(21) Appl. No.: 15/666,439

(22) Filed: Aug. 1, 2017

(65) Prior Publication Data

US 2018/0035514 A1 Feb. 1, 2018

Related U.S. Application Data

(60) Provisional application No. 62/369,526, filed on Aug. 1, 2016.

(51) Int. Cl.
*H05B 37/02* (2006.01)
*F21V 19/00* (2006.01)
(Continued)

(52) U.S. Cl.
CPC .......... *H05B 37/0236* (2013.01); *F21V 3/00* (2013.01); *F21V 19/0015* (2013.01);
(Continued)

(58) Field of Classification Search
CPC ................ H05B 37/02; H05B 37/0227; H05B 37/0236; H05B 37/0272; H05B 33/08;
(Continued)

(56) References Cited

U.S. PATENT DOCUMENTS 6,616,291 B1 * 9/2003 Love .................. F21S 8/00
315/185 R
6,623,151 B2 * 9/2003 Pederson ............. B60Q 1/2611
362/542
(Continued)

OTHER PUBLICATIONS

International Search Report of the International Searching Authority dated Dec. 4, 2017, issued in connection with International Application No. PCT/US2017/044976 (5 pages).
(Continued)

*Primary Examiner* — Jimmy T Vu
(74) *Attorney, Agent, or Firm* — McCarter & English, LLP

(57) ABSTRACT

A system and method for an accent lighting system is provided. The system includes a plurality of underwater luminaires each having a plurality of light emitting diodes, and a junction box controller housing a plurality of electrical components for generating electrical signals for controlling the plurality of underwater luminaries. The junction box controller can be mounted to an electrical conduit and a plurality of cables can connect the plurality of underwater luminaires with the junction box controller. An underwater luminaire can include a heat sink and a flexible circuit board having a plurality of light emitting diodes mounted on the heat sink. The flexible circuit board transfers heat from the light emitting diodes to the heat sink. The underwater luminaire can also include a wiring harness for connecting the underwater luminaire to a cable. The underwater luminaire can also include a housing having a lens positioned at one end, an end cap mounted to an opposite end of the housing. The housing and the end cap can form a waterproof enclosure for the heatsink, the flexible circuit board, the plurality of light emitting diodes, and the wiring harness.

14 Claims, 28 Drawing Sheets

(51) Int. Cl.
  *H04R 1/02*       (2006.01)
  *F21V 23/06*      (2006.01)
  *F21V 29/70*      (2015.01)
  *F21V 3/00*       (2015.01)
  *H05B 33/08*      (2020.01)
  *F21W 131/401*    (2006.01)
  *F21Y 113/13*     (2016.01)
  *F21Y 115/10*     (2016.01)
  *F21V 31/00*      (2006.01)

(52) U.S. Cl.
  CPC ............. *F21V 23/06* (2013.01); *F21V 29/70* (2015.01); *H05B 33/0809* (2013.01); *H05B 33/0854* (2013.01); *H05B 33/0872* (2013.01); *H05B 37/0272* (2013.01); *F21V 31/005* (2013.01); *F21W 2131/401* (2013.01); *F21Y 2113/13* (2016.08); *F21Y 2115/10* (2016.08); *H04R 1/028* (2013.01); *H04R 2201/028* (2013.01)

(58) Field of Classification Search
  CPC . H05B 33/0809; H05B 33/0854; F21V 29/70; F21V 3/00; F21V 19/0015; F21V 23/06; F21V 31/005; F21Y 2113/13; F21Y 2115/10; F21W 2131/401; H04R 1/028; H04R 2201/028
  See application file for complete search history.

(56) References Cited

U.S. PATENT DOCUMENTS

| | | | |
|---|---|---|---|
| 9,726,332 B1 * | 8/2017 | May ....................... | F21V 7/00 |
| 2005/0224715 A1 | 10/2005 | Devine | |
| 2008/0158860 A1 | 7/2008 | Sloan | |
| 2008/0165547 A1 | 7/2008 | Amor et al. | |
| 2013/0249394 A1 | 9/2013 | Fay | |

OTHER PUBLICATIONS

Written Opinion of the International Searching Authority dated Dec. 4, 2017, issued in connection with International Application No. PCT/US2017/044976 (5 pages).

Invitation to Pay Additional Fees issued by the International Searching Authority dated Sep. 8, 2017, issued in connection with International Application No. PCT/US2017/044976 (2 pages).

* cited by examiner

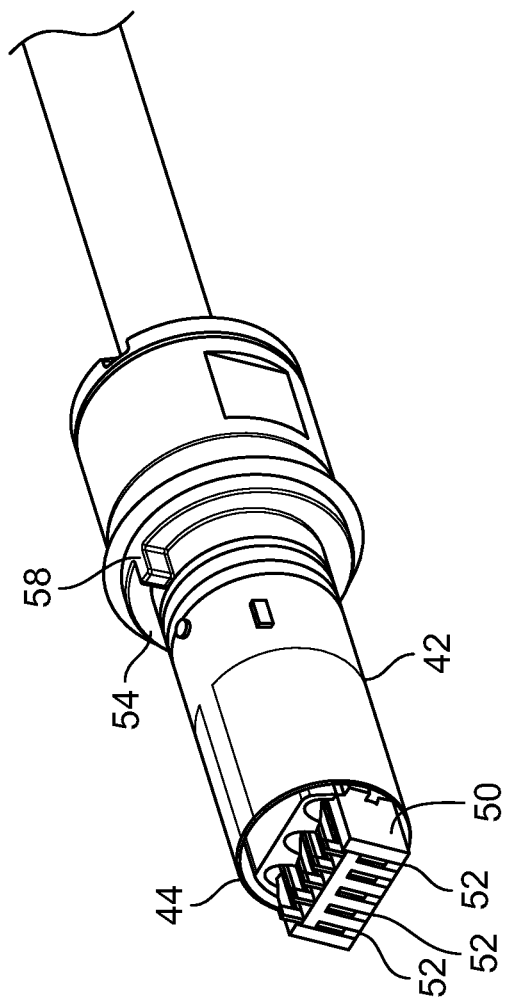
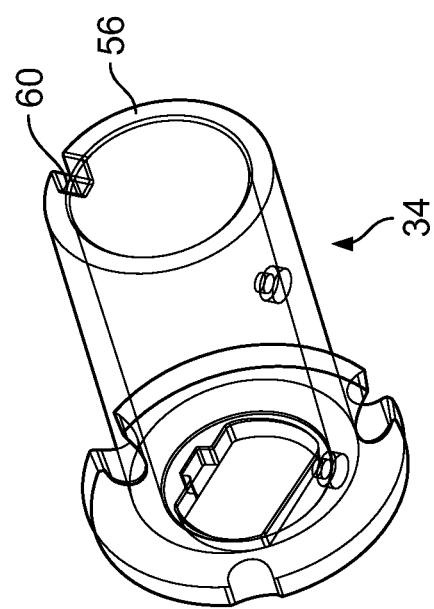
FIG. 4

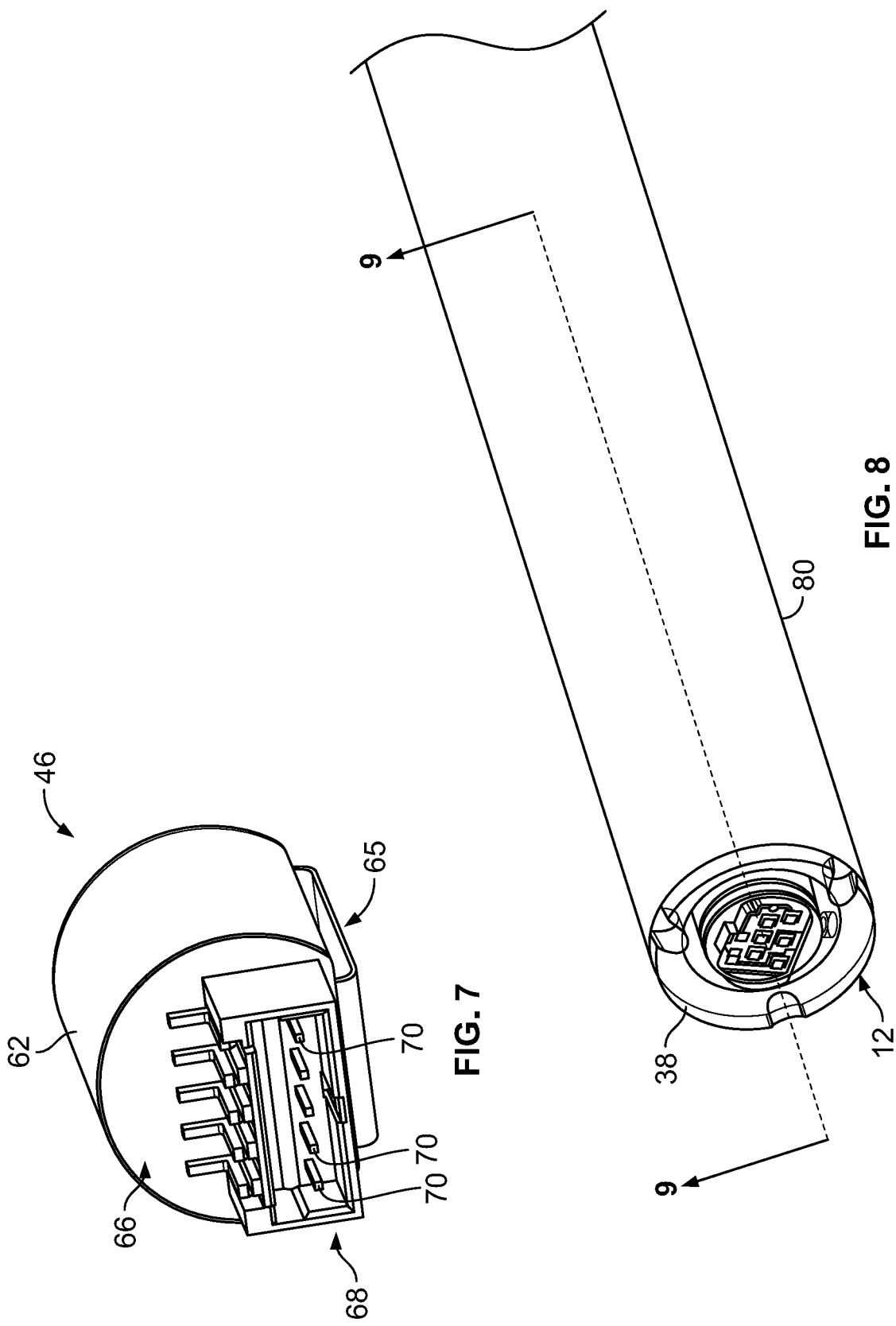

ACCENT LIGHTS WITH JUNCTION BOX CONTROLLER

RELATED APPLICATIONS

This application claims priority to United States Provisional Patent Application No. 62/369,526 filed on Aug. 1, 2016, the entire disclosure of which is incorporated herein by reference.

BACKGROUND

Field of the Disclosure

The present disclosure relates generally to lighting systems for various installations such as landscapes, pools, spas, etc. More specifically, the present disclosure relates to accent lights with a junction box controller for controlling the lights.

RELATED ART

Pool and spa owners often install pool/spa lights in order to add ambiance to a pool/spa setting. For example, submersible lights installed in the walls of a pool or spa are known and commonly used. It is also known to install "accent" lights at various locations in a pool or spa, as well as at various locations in landscaping surrounding pools or spas, to provide a desired lighting effect. Such accent lights are usually smaller than conventional pool/spa lights, and are designed to be installed in conduits or pipes. Increasingly, pool/spa/landscape lights include light-emitting diodes (LEDs) which generate rich colors.

Often, pool and spa lights (including accent lights) include on-board controllers for controlling light patterns emitted by the lights. Such controllers are microprocessor-based, and often include stored light control programs that can be activated to produce a desired lighting effect. However, the presence of the controller within the light, as well as associated circuitry for driving the LEDs, adds to both the size and weight of pool and spa lights. Moreover, existing LED accent lights are not sufficiently small so that they can be used in a variety of locations (such as in steps, pool/spa decks, or other locations). Still further, while it is known to remotely control pool/spa lights using a central controller in communication with pool/spa lights, such central controllers are often entire pool/spa system controller (e.g., controllers which control devices in addition to pool/spa lights, such as filters, pumps, heaters, chlorinators, etc.) Such system controllers are not inexpensive, and there are customers who do not desire to purchase such equipment but who still desire to have some type of central control of lights.

The system of the present disclosure addresses the foregoing limitations of existing pool/spa/landscape lighting systems by providing accent lights that can be installed in a variety of locations, and a junction box controller for providing central control of the lights.

SUMMARY

The present disclosure relates to accent lights having and a junction box controller for such lights. The accent lights can be installed in a pipe or a conduit, and can be located anywhere in a pool/spa environment, a landscaping location, or at other desired locations throughout a home or commercial installation. Each light includes a body having a back portion and a front portion, a cylindrical portion located in the front portion, an end cap located in the back portion, a compressible ring secured around the body, a lens attached to the front portion, a flat shoulder disposed between the lens and the front portion, a heatsink having a front surface and a back surface, and a plurality of light emitting diodes. The junction box controller includes a junction box, a plurality of connection lines for connecting the plurality of lights with the junction box, a transformer, a transformer voltage line connecting the transformer to the junction box, and a controller housed in the junction box. The controller includes a microcontroller and associated circuitry for remotely controlling the accent lights.

An underwater luminaire is also provided. The underwater luminaire can include a heat sink, and a flexible circuit board having a plurality of light emitting diodes mounted on the heatsink. The flexible circuit board can be mounted to the heat sink and can transfer heat from the light emitting diodes to the heat sink. The underwater luminaire can also include a wiring harness for connecting the underwater luminaire to a cable. The underwater luminaire can also include a housing having a lens positioned at one end and an end cap mounted to an opposite end of the housing. The housing and the end cap can form a waterproof enclosure for the heatsink, the flexible circuit board, the plurality of light emitting diodes, and the wiring harness.

An accent lighting system is also provided. The system can include a plurality of underwater luminaires each having a plurality of light emitting diodes. The system can also include a junction box controller housing a plurality of electrical components for generating electrical signals for controlling the plurality of underwater luminaires, the junction box controller mounted to an electrical conduit. The system can also include a plurality of cables interconnecting the plurality of underwater luminaires with the junction box controller.

A method for controlling an accent lighting system is also provided. The method includes receiving a plurality of electrical signals from a plurality of underwater luminaires, each of the plurality of underwater luminaires having a plurality of light emitting diodes. The method also includes determining whether the plurality of underwater luminaires were manufactured by a certain manufacturer based on a SKU resistor and a thermistor coupled to the plurality of light emitting diodes. The method also includes generating a plurality of electrical signals for controlling a plurality of underwater luminaires based on the determination that the plurality of underwater luminaries were manufactured by a certain manufacturer.

BRIEF DESCRIPTION OF THE DRAWINGS

The foregoing features of the disclosure will be apparent from the following Detailed Description, taken in connection with the accompanying drawings, in which:

FIG. 4 is a partial exploded view of the light of FIG. 2;

FIG. 7 is a rear view of the heat sink of FIG. 5;

FIG. 8 is a perspective view illustrating installation of the accent light of the present disclosure in a conduit or pipe;

DETAILED DESCRIPTION

The present disclosure relates to accent lights and an associated junction box controller for use in various installations, as discussed in detail below in connection with FIGS. 1-20. As used herein, the term "pipe" or "conduit" refers to pipes, conduits, fixtures, and/or other components in a pool or spa setting which are physically capable of receiving the light of the present disclosure.

Figure 1:
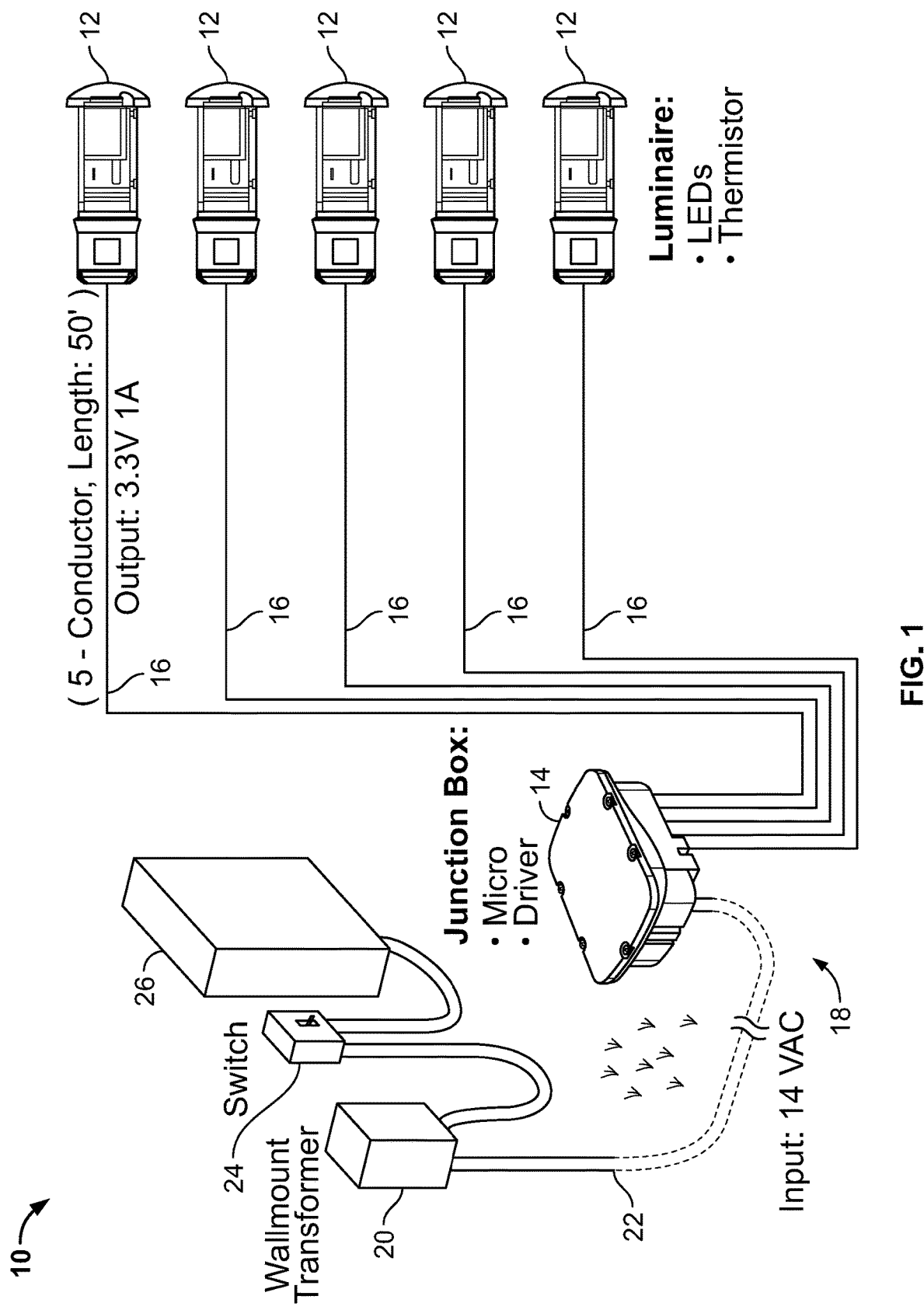
FIG. 1 is a diagram showing the system of the present disclosure.

FIG. 1 is a diagram showing the system of the present disclosure, indicated generally at 10. The system 10 includes a plurality of lights 12 and a junction box controller 14 which includes a dedicated controller for controlling operation of the lights 12. As shown, the controller 14 could be mounted on a plurality of conduits extending from ground 18, or at any other desired location. A plurality of cables 16 interconnect the controller 14 to the plurality of lights 12, each providing electrical power and controlling light output for a respective light 12, as discussed in detail below. Also, as shown, a transformer 20 is connected to the junction box controller 14 via a power line 22, for providing low-voltage (e.g., 14 volts alternating current (AC)) electrical power to the controller 14. A switch 24 could also be provided for selectively controlling power to the lights 12, and for remotely controlling light "shows" (colors/intensities, and/or combinations thereof) generated by the lights 12. A breaker panel 26 could provide power to the switch 24, and could distribute power to other pool/spa components, such as heaters, pumps, chlorinators, etc. As can be appreciated with reference to FIG. 1, the junction box controller 14 provides an unobtrusive, easy-to-install way of remotely controlling the lights 12 from a central location.

Figure 12:
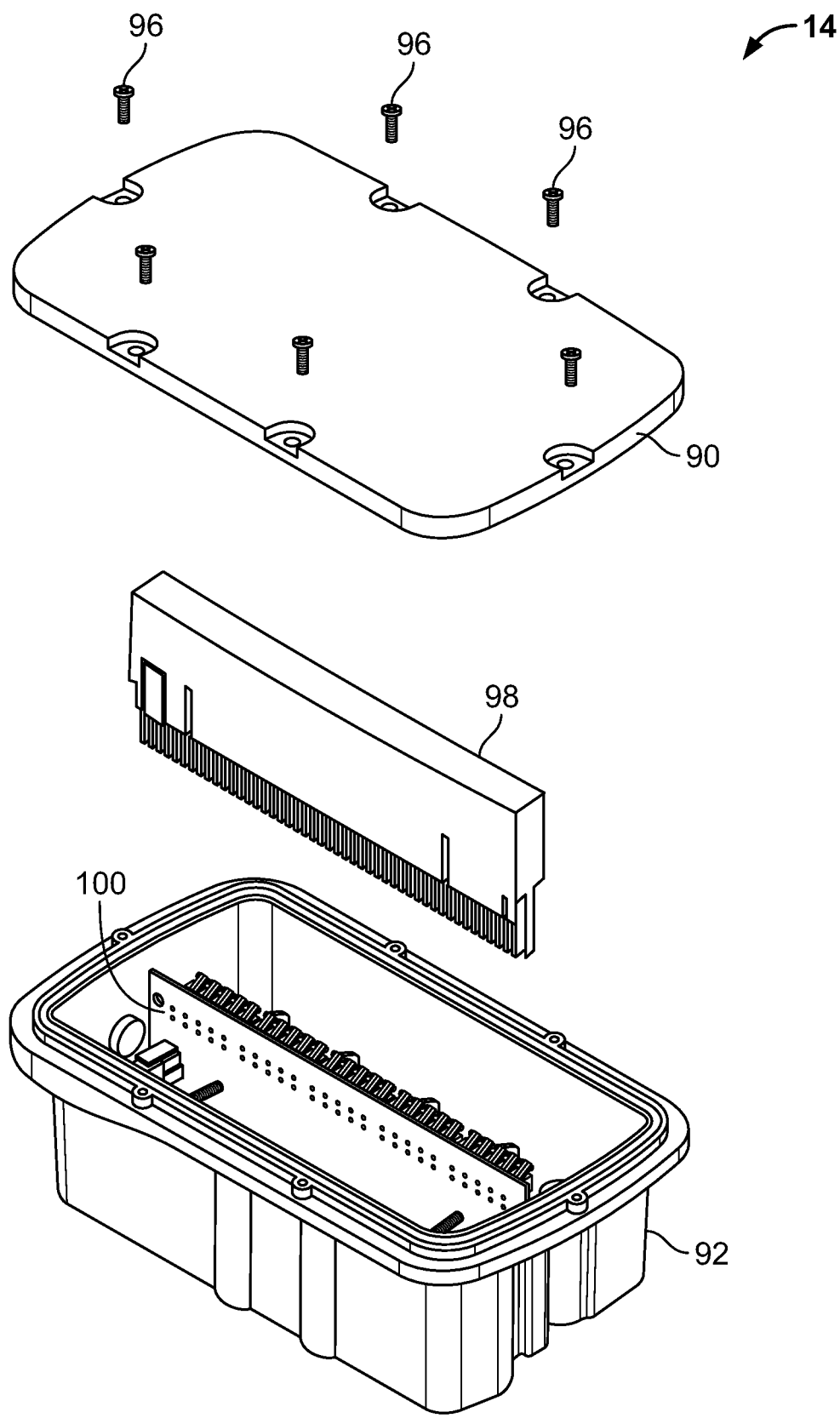
FIG. 12 is an exploded view of the junction box controller of the present disclosure.
Figure 13:
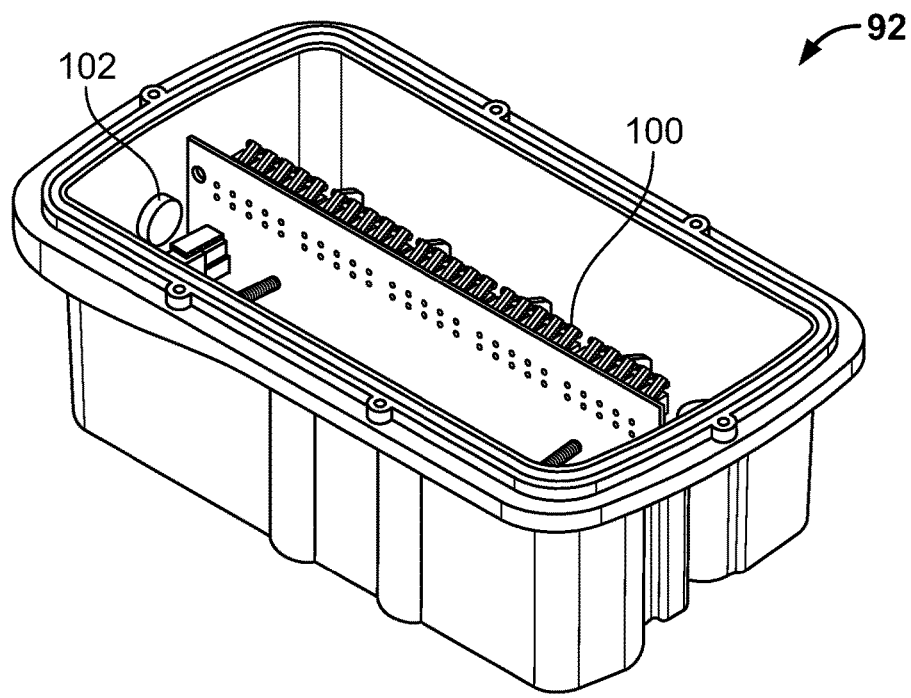
FIG. 13 is a perspective view of the junction box controller of the present disclosure.
Figure 14:
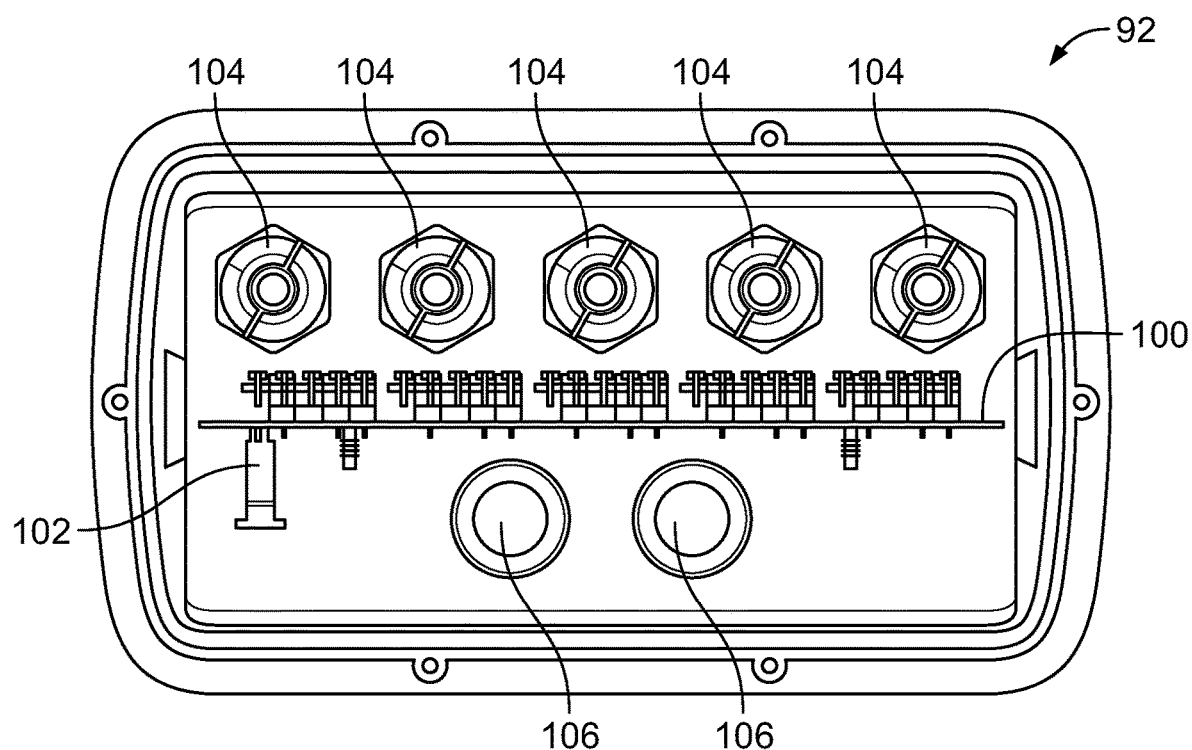
FIG. 14 is a top view of the junction box controller of the present disclosure.

Additionally, as noted in FIG. 12, each light 12 includes a plurality of light-emitting diodes (LEDs) and a thermistor for monitoring temperature of the light, as will be discussed in greater detail below. The lights 12 could be installed at various locations in a pool/spa environment, and/or in landscaping surrounding such an environment. Preferably, the lights 12 are of a diameter sufficient to fit within ½ inch PVC conduit, which can easily be installed at desired locations in a pool/spa location and/or in landscaping features. Due to their relatively small size, the lights 12 can thus provide accent lighting at locations where ordinary lights cannot easily fit, such as in steps, in rock formations, in pool/spa decking, etc. Of course, the lights 12 could be of any desired size or shape without departing from the spirit or scope of the present disclosure. Further, it is noted that the cables 16 could be of any desired length (e.g., 50 feet), and could include any desired number of conductors (e.g., 5), and can be fed through conduit interconnecting the lights 12 with the controller 14. The controller 14 includes a programmed microprocessor (as described in detail below) as well as a plurality of drivers (e.g., transistors and associated circuitry) for driving LEDs of the lights 12.

Figure 2:
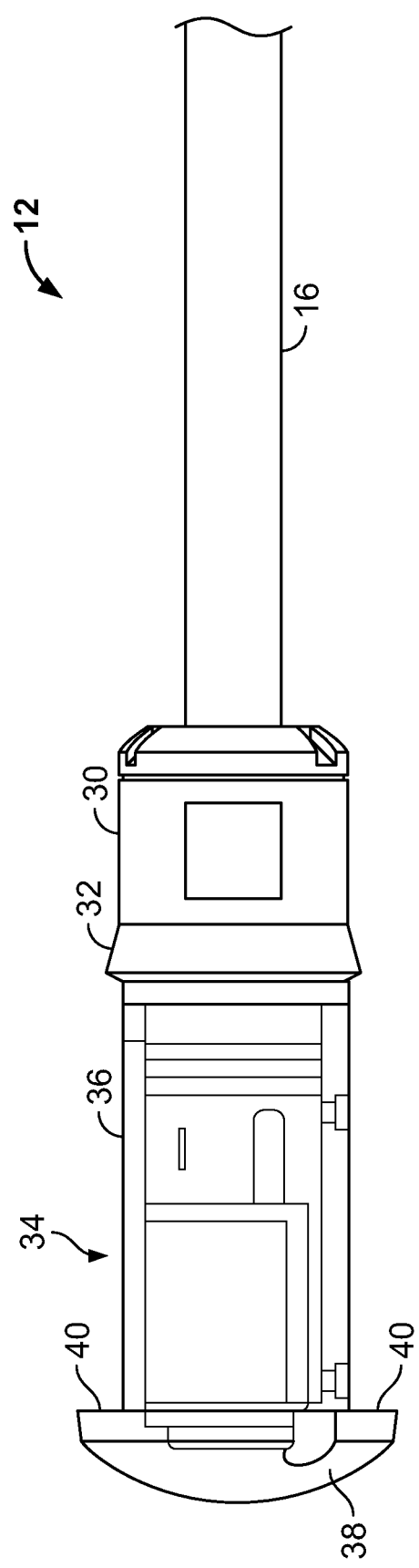
FIG. 2 is a side view of an accent light in accordance with the present disclosure.

FIGS. 2-9 illustrate the light 12 in greater detail. Referring to FIG. 2, which is a side view of the light 12, it can be seen that the light 12 includes a housing 34 having a cylindrical portion 36 and a front lens 38 attached to (and/or, formed integrally with) the cylindrical portion 36. An end cap 30 attaches to the cylindrical portion 36 to form a watertight housing for the light 12. A compressible ring 32 is secured around the body of light 12, and is positioned between the end cap 30 and the cylindrical portion 36. A flat shoulder 40 is provided on the rear surface of the lens 38 to allow for flush mating with the end of a conduit into which the light 12 is installed, as will be described in greater detail below. As noted, the lens 38 could be integrally formed with the cylindrical portion 36 or attached thereto using any suitable attachment means, such as ultrasonic welding, adhesives, mechanical interconnection, etc. As will be explained in more detail below, compressible ring 32 retains the light 12 in place when it is mounted on the conduit by way of a compression fit.

Figure 3:
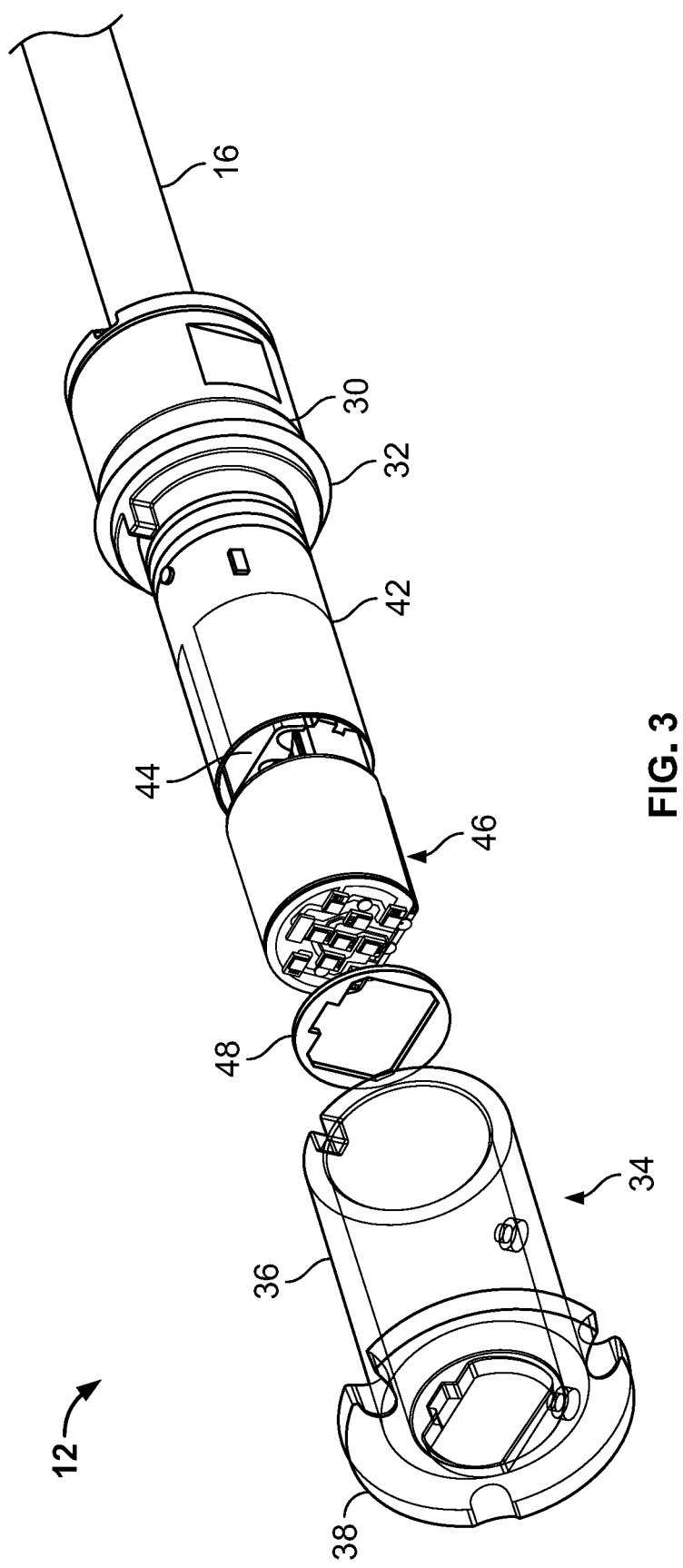
FIG. 3 is an exploded view of the light of FIG. 2.

Reference is now made to both FIGS. 3-4 in connection with light 12, which are exploded views of light 12, showing additional components housed within the cylindrical portion 36. Specifically, the light 12 includes an internal coupling 42, a spacer 44, a heat sink 46, and a spacer component 48. The spacer component 48 is positioned within cylindrical portion 36 and disposed between lens 38 and heat sink 46, to facilitate proper fitting of the heat sink 46 within the housing 34. The light 12 also includes wiring harness 50 which has a plurality of electrical contacts 52 (pins) within the harness 50. An annular surface 56 of cylindrical portion 36 mates with a corresponding annular surface 54 when the housing 34 is connected to the end cap 30. Additionally, when this happens, a protrusion 58 of the end cap 30 mates with a notch 60 formed in the housing 34, to facilitate alignment of the housing 34 with the end cap 30 and to prevent rotation of the two parts with respect to each other when they are mated. The spacer 44 and the wiring harness 50 are positioned within the coupling 42. The cylindrical portion 36 has a greater diameter than internal coupling 42, which allows the internal coupling 42 to be fitted within the cylindrical portion 36.

Figure 6:
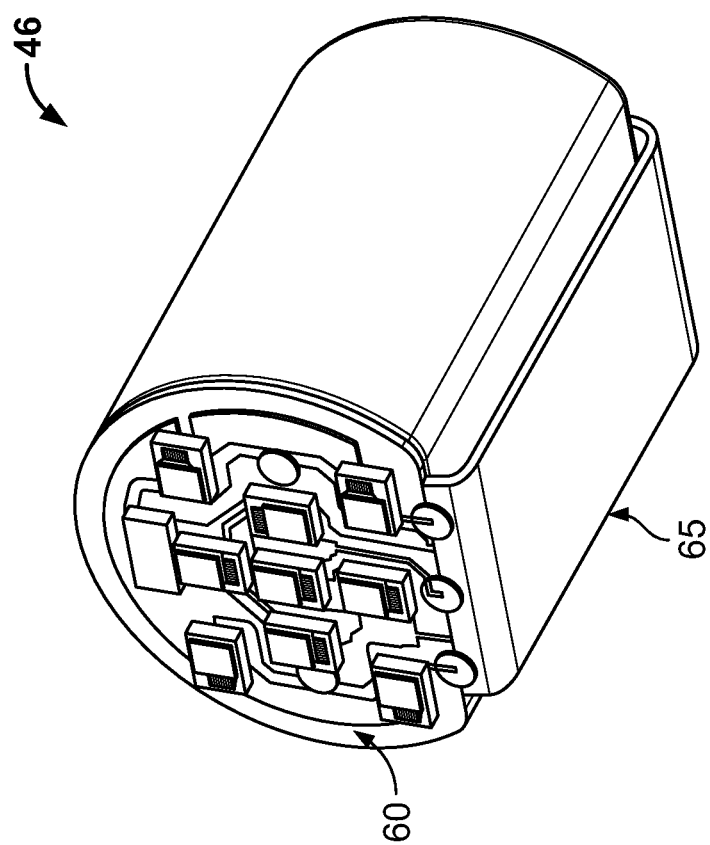
FIG. 6 is a perspective view of the heat sink of FIG. 5.
Figure 5:
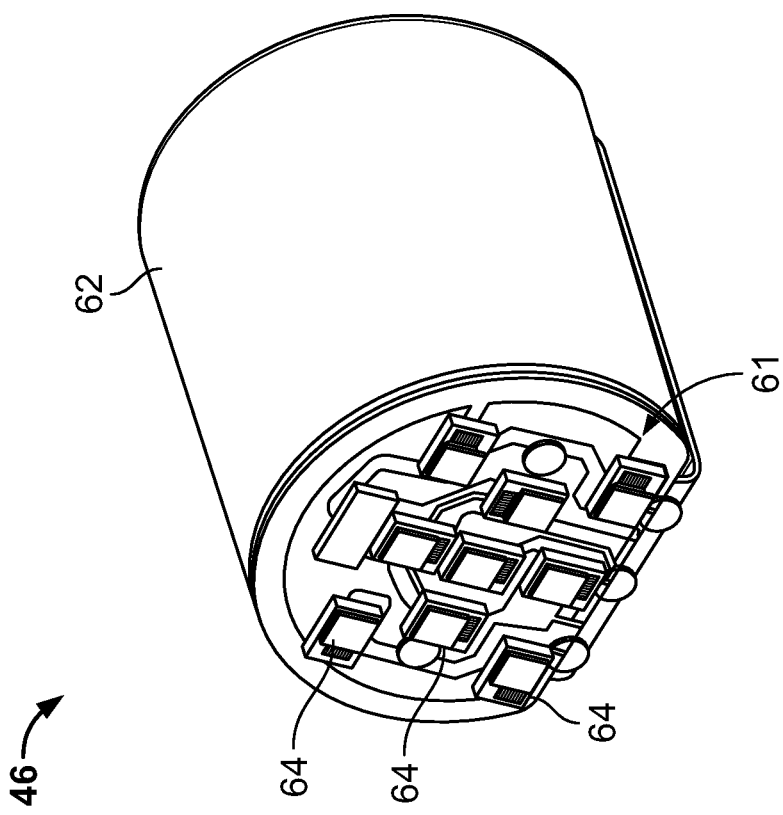
FIG. 5 is a perspective view of a heat sink included in the light of FIG. 2.

Reference is now made to FIGS. 5-7, which are perspective and rear views showing the heat sink 62 and associated components in greater detail. The heat sink 46 includes a front surface to which a circuit board 61 is mounted, a cylindrical surface 62, a plurality of light emitting diodes 64 ("LEDs") mounted to the circuit board 61, an interconnecting circuit 65, a rear surface 66, a connector 68, and plurality of wiring pins 70. The front surface is in thermal communication with the board 61 to facilitate the dissipation of heat generated by the LEDs 64. The heat sink 46 can be constructed using any suitable material known in the art such as aluminum, copper, etc. The LEDs 64 can include LEDs of different colors and intensity (e.g., red, green, and blue (RGB) LEDs, white (W) LEDs, RGBW LEDs, etc., or ultraviolet LEDs). LEDs 64 are in electrical communication with a programmed controller in the junction box controller 14, which provides the control signals to generate various colors, intensities, and light "shows" as will be explained in greater detail below. LEDs 64 are in electrical communication with the junction box controller 14 through wiring pins 70, which are in electrical communication with one of the cables 16 through electrical contacts 52. Connector 68 houses wiring pins 70, and therefore facilitates the connection between a cable 16 and wiring pins 70.

It is noted that the circuit board 61 and the interconnecting circuit 65 could together form a flexible circuit assembly, such that the board 61 and the interconnecting circuit 65 could be formed from a single, flat piece of flexible circuit board material. Once fabricated, the board 61 could be mounted to the front face of the heat sink 62, the interconnecting circuit 65 could be "wrapped" underneath the heat sink 62, and the connector 68 (which is attached to the interconnecting circuit 65) could be attached to the opposite (rear) face of the heat sink 62, allowing for quick and easy fabrication of the assembly. Optionally, the interconnecting circuit 65 and the board 61 could be separate pieces.

Figure 9:
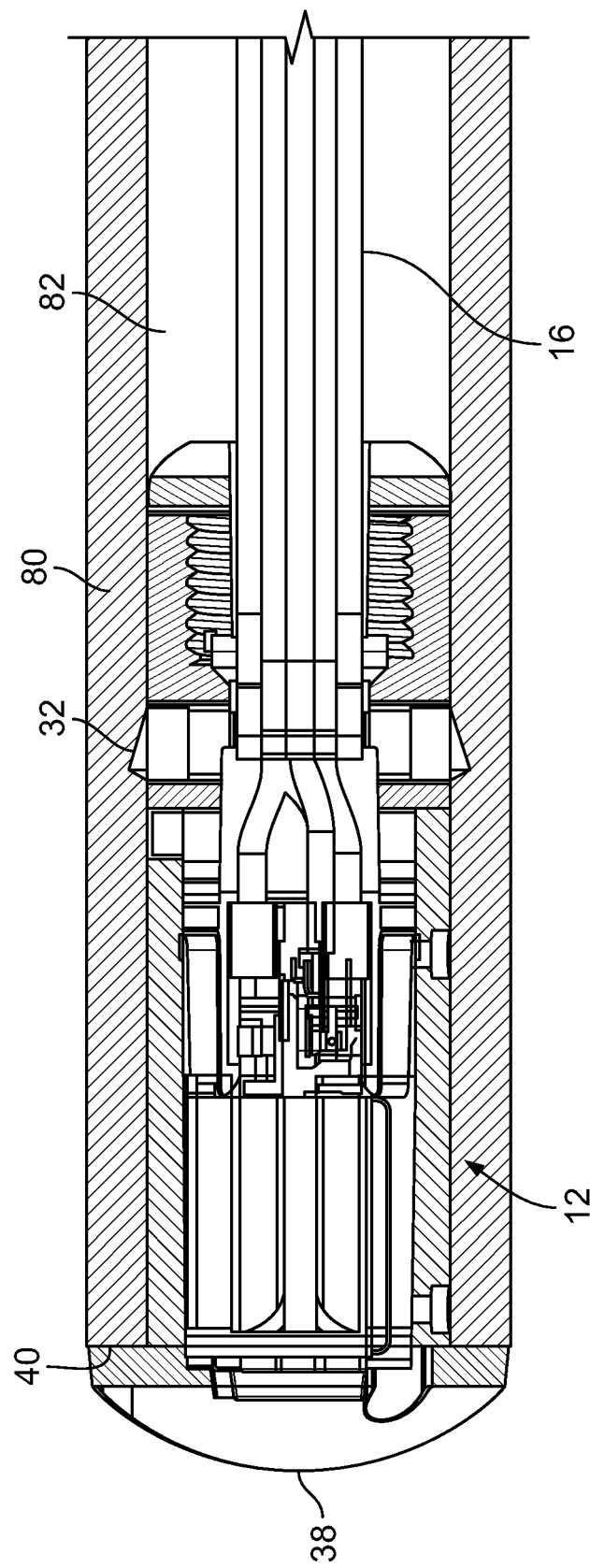
FIG. 9 is a sectional view of the light taken along line 9-9 of FIG. 8.
Figure 10:
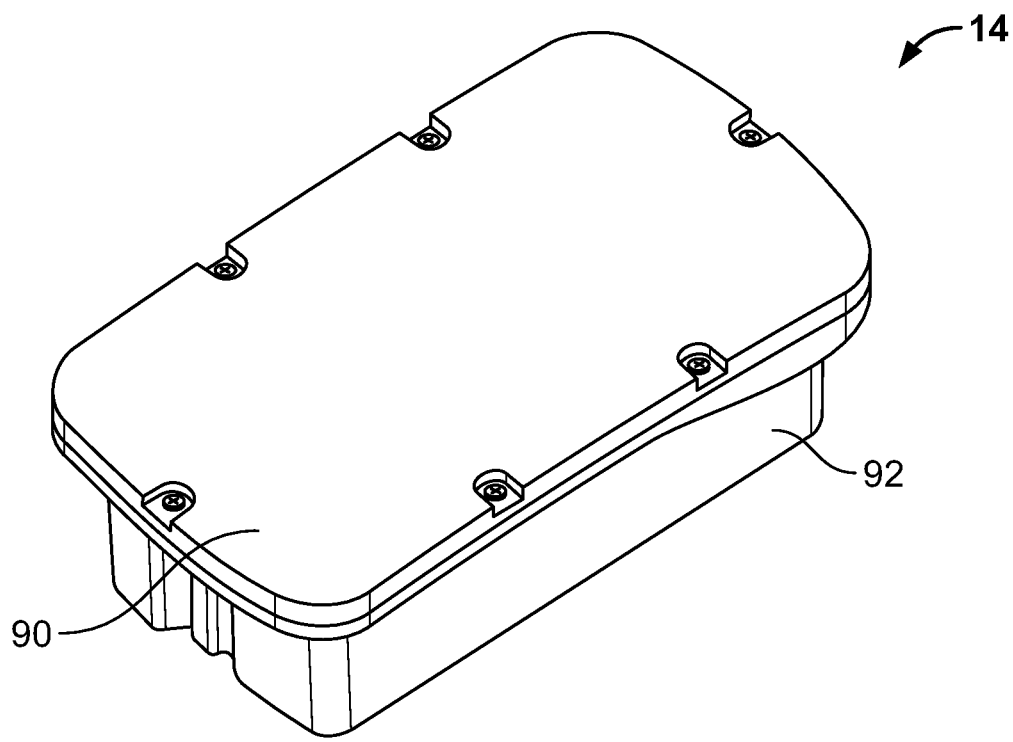
FIG. 10 is a perspective view of a first embodiment of a junction box controller of the present disclosure.
Figure 11:
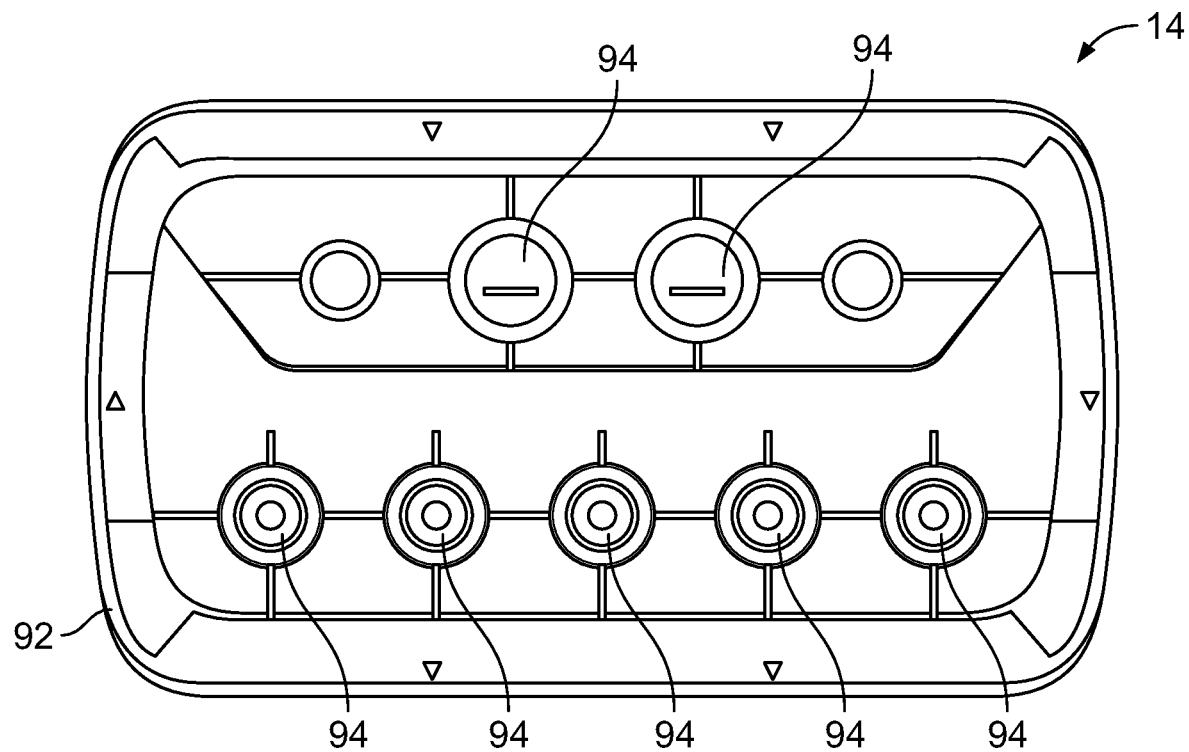
FIG. 11 is a top view looking into the bottom portion of the junction box controller of the present disclosure.

Reference will now be made to FIGS. 8-9, which are perspective and sectional views, respectively, illustrating installation of the light 12 in a conduit 80. As can be seen, the conduit 80 surrounds the housing 34, the end cap 30, and the cable 16 when the light 12 is installed in the conduit 80. The lens 38 is flush fit against an edge of the conduit 80 so that flat shoulder 40 directly abuts the edge of the conduit 80. The outer surface of compressible ring 32 directly engages with an inner surface 82 of the conduit 80 when the light 12 is installed in the conduit 80. The compressible ring 32 creates a frictional engagement with the inner surface 82 of the conduit 80, such that the light 12 is difficult to remove from the conduit 80. It is noted that the compressible ring 32 could be disposed between the end cap 30 and the housing 34, or anywhere on the body of light 12. Further, the compressible ring 32 can be made of any material know in the art to create a sufficient force of friction with conduit 80, such as plastic, rubber, etc. The conduit 80 could be made of any material known in the art such as polyvinyl chloride ("PVC").

Reference is now made to FIGS. 10-14 which are perspective and exploded views illustrating the junction box controller 14 in greater detail. The junction box controller 14 includes a lid 90 and a bottom compartment 92. The lid 90 is secured to a bottom compartment 92 with a plurality of screws 96 to create a tight seal to prevent debris, water, and other foreign materials from entering the junction box controller 14. The junction box controller 14 also includes a plurality of apertures 94, a cartridge 98, and a controller 100. The plurality of apertures 94 allow for the connection of the plurality of conduits 80 to the junction box 14, which facilitates an electrical communication between cartridge 98 and controller 100 with plurality of lights 12. It is preferable that cartridge 98 be easily removable so that it may be replaced in the event that it is damaged. The junction box controller 14 also includes an electrical connector 102, a plurality of grommets 104, and apertures 106. The electrical connector 102 provides input voltage to the controller 100. The electrical connector 102 receives its voltage input from the power line 22. The plurality of grommets 104 create a protective seal with the cables 16 (not shown in FIG. 14) in order to tightly secure the cables 16 and protect them from adverse weather conditions. The apertures 106 are the same as the apertures 94 but are shown in different views.

Figure 15:
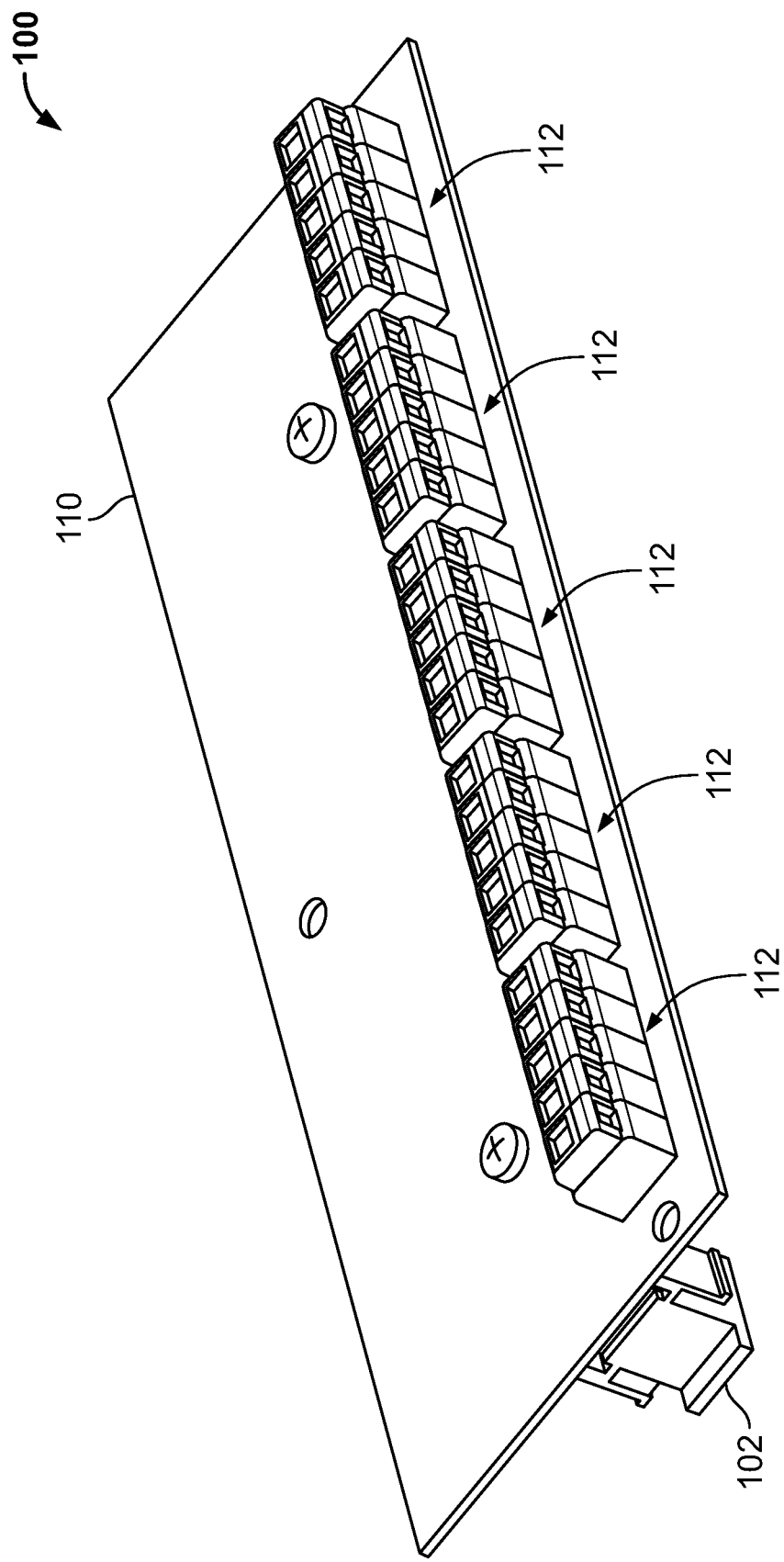
FIG. 15 is a perspective view of a printed circuit board of the controller.

Reference will now be made to FIG. 15, which is a perspective view showing the controller 100 in more detail. The controller 100 includes a printed circuit board 110, a plurality of wiring connectors 112, and an electrical connector 102. The electrical connector 102 provides power from power line 22. The printed circuit board 110 contains electrical circuitry to control the plurality of lights 12, which will be discussed in greater detail below. The plurality of wiring connectors 112 includes connectors corresponding to each color of the LEDs 64. For example, the connector 112 could have a connector for each of red, green, blue, white LEDs, and one for ground. The controller 100 could also include a wireless component for network connectivity in order to receive wireless updates and so that the user can remotely control all the functions of the system.

Figure 16:
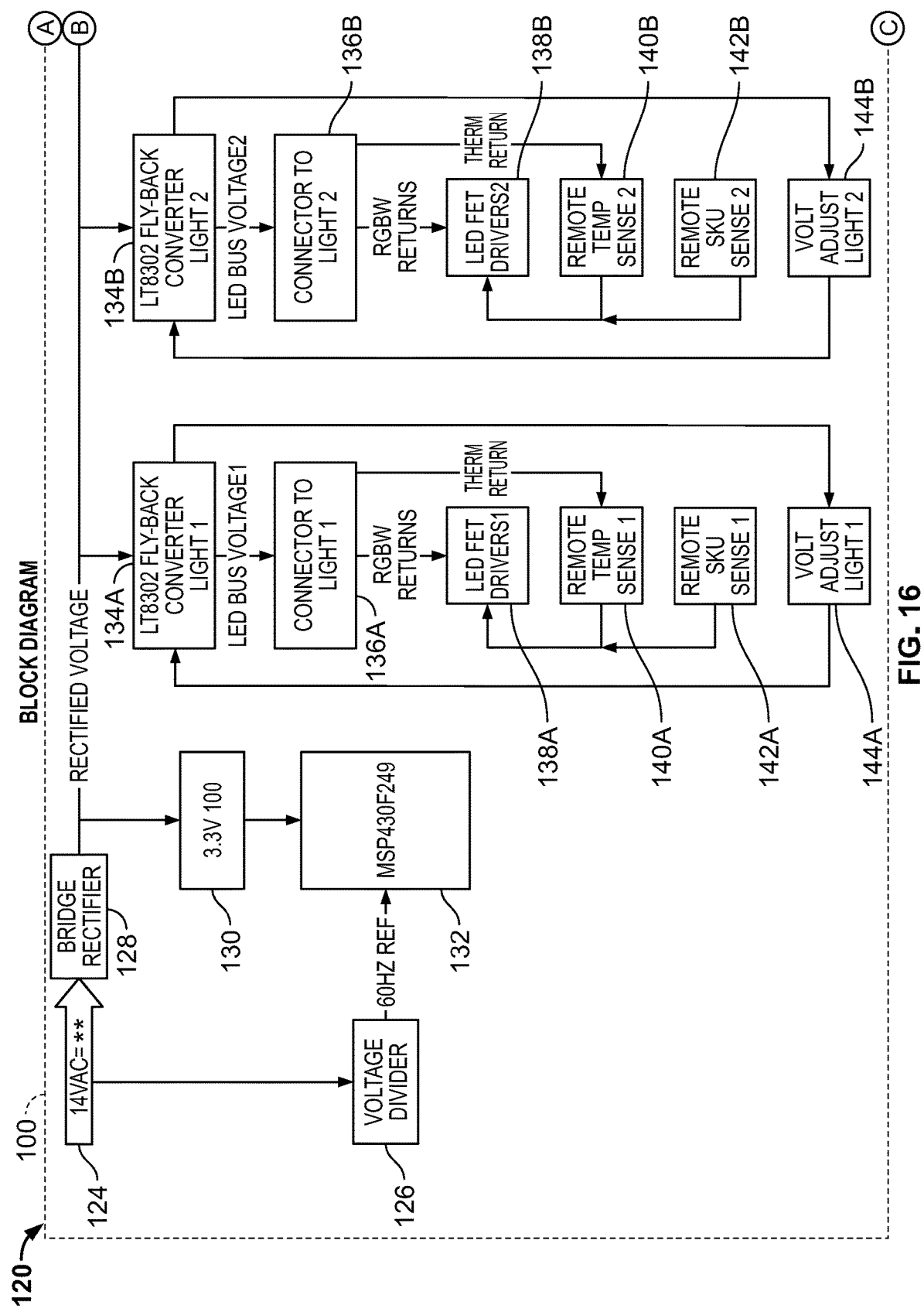
FIG. 16 is a block diagram illustrating hardware components of the junction box controller.
Figure 16:
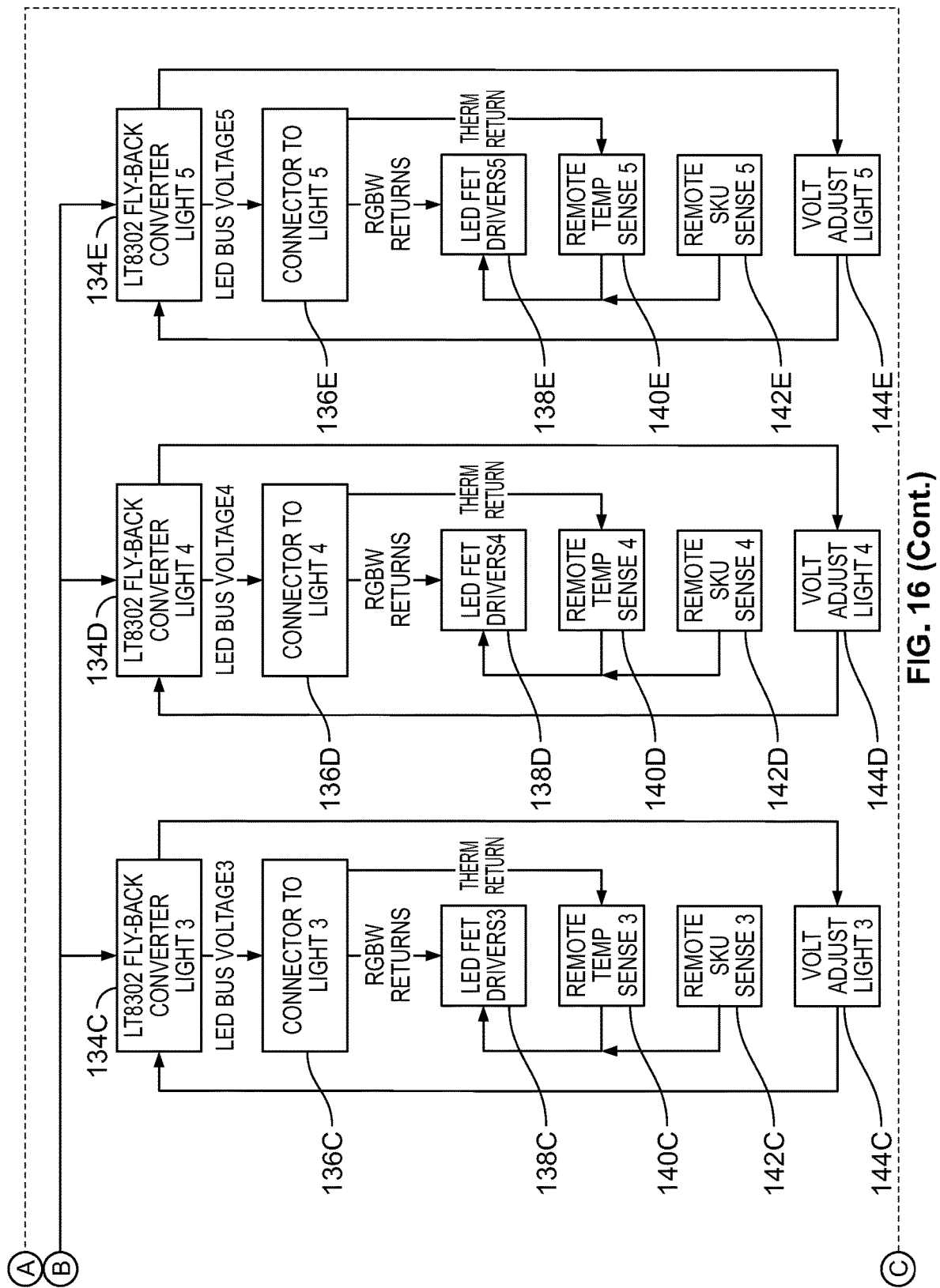

Reference is now made to FIGS. 16-17, which are block diagrams and schematics respectively, showing the circuitry of controller 100 in greater detail. For each light 12 in the system, the controller 100 includes a fly-back converter 134A-134E, a connector 136A-136E, an LED FET driver 138A-138E, a remote temperature sensing module 140A-140E, a remote stock keeping unit ("SKU") sensing module 142A-142E, and a voltage adjustor 144A-144E. These components will be discussed in greater detail below. In the discussion below, reference will be made to reference numerals 134, 136, 138, 140, 142, and 144, it being understood that an individual one of the components 134A-134E, 136A-136E, 138A-138E, 140A-140E, 142A-142E, and 144A-144E is being described.

Figure 17A:
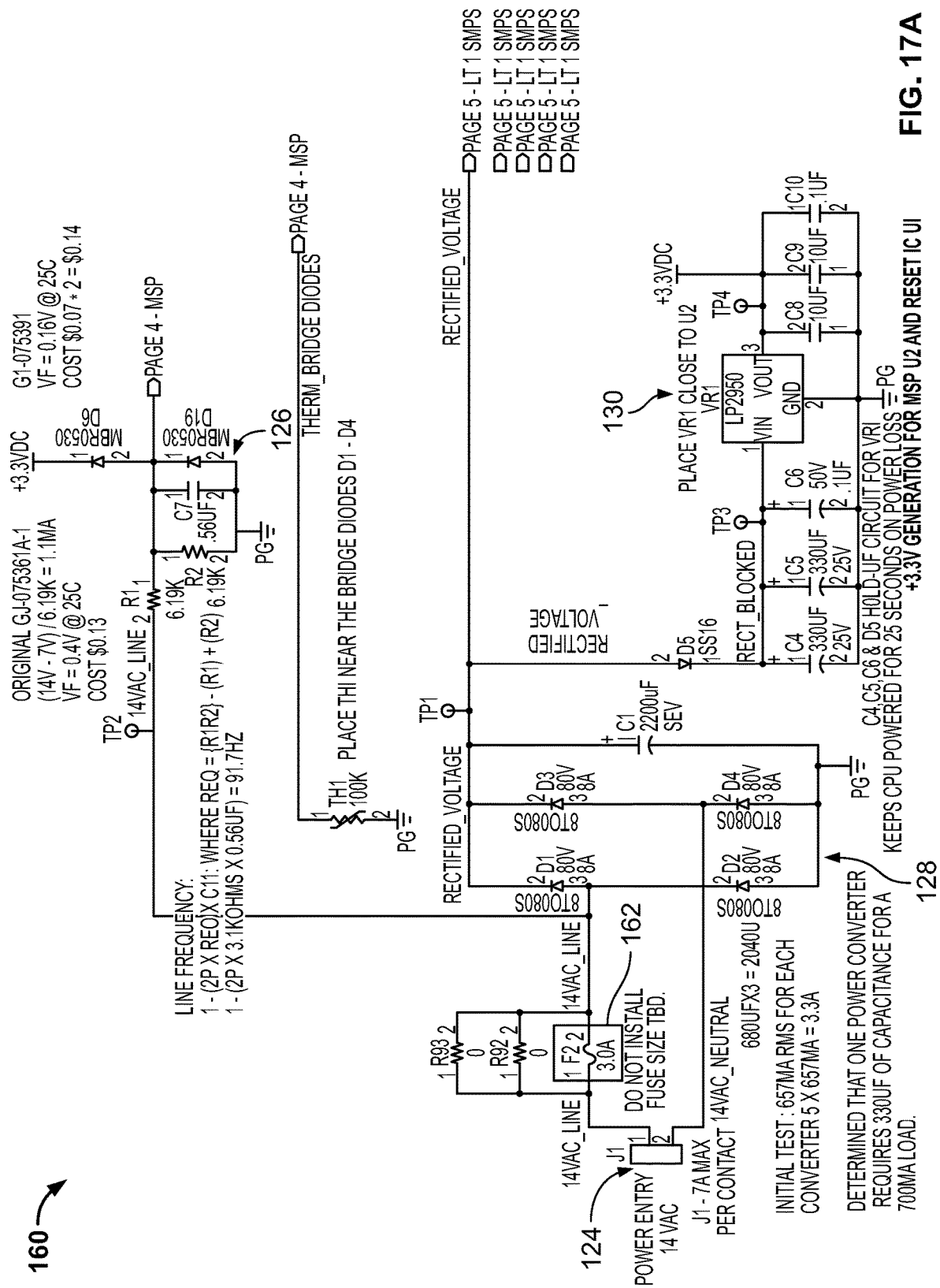
FIGS. 17A-17F are electrical schematic diagrams of the junction box controller.

FIG. 17A is a schematic showing components of the controller 100 in greater detail. For example, the controller 100 includes an AC input 124, which is connected to a fuse 162 to provide for overcurrent protection with respect to the various components within the controller 100. The AC input 124 receives its electrical input from the electrical connector as shown in FIG. 15. The controller 100 also includes a voltage divider 126, which reduces the voltage of the AC input 124. The voltage divider 126 circuitry could include a combination of resistors and capacitors as shown in FIG. 17A or any other suitable means known in the art. The controller 100 also includes a bridge rectifier 128 to convert the AC input 124 to a rectified direct current ("DC") output. This could be achieved by arranging four diodes in the configuration as shown in FIG. 17A, however, any suitable method of converting an AC input to a DC output could be used. The rectified voltage from the bridge rectifier 128 enters a low dropout voltage stabilizer 130. Chip number LP 2950 manufactured by Texas Instruments could be used as the low dropout voltage stabilizer 130, however any other suitable chip could be used. Capacitors and diodes could be arranged as shown in FIG. 17A to keep low dropout voltage stabilizer 130 powered on in the event of power loss. The purpose of the low dropout voltage stabilizer 130 is to maintain a constant voltage level output. This output is then used as the input voltage to a microcontroller 132.

Figure 17B:
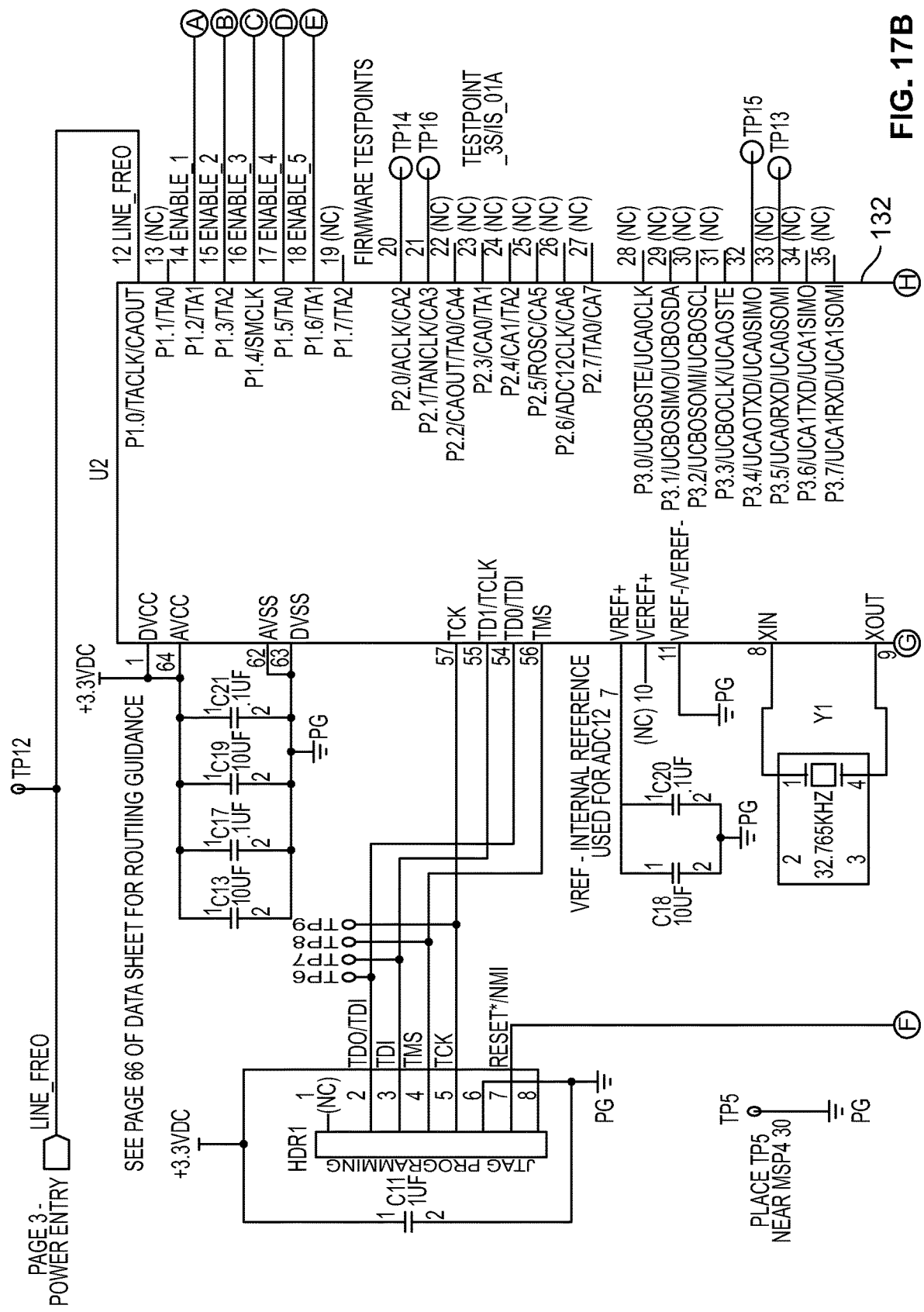
Figure 17B:
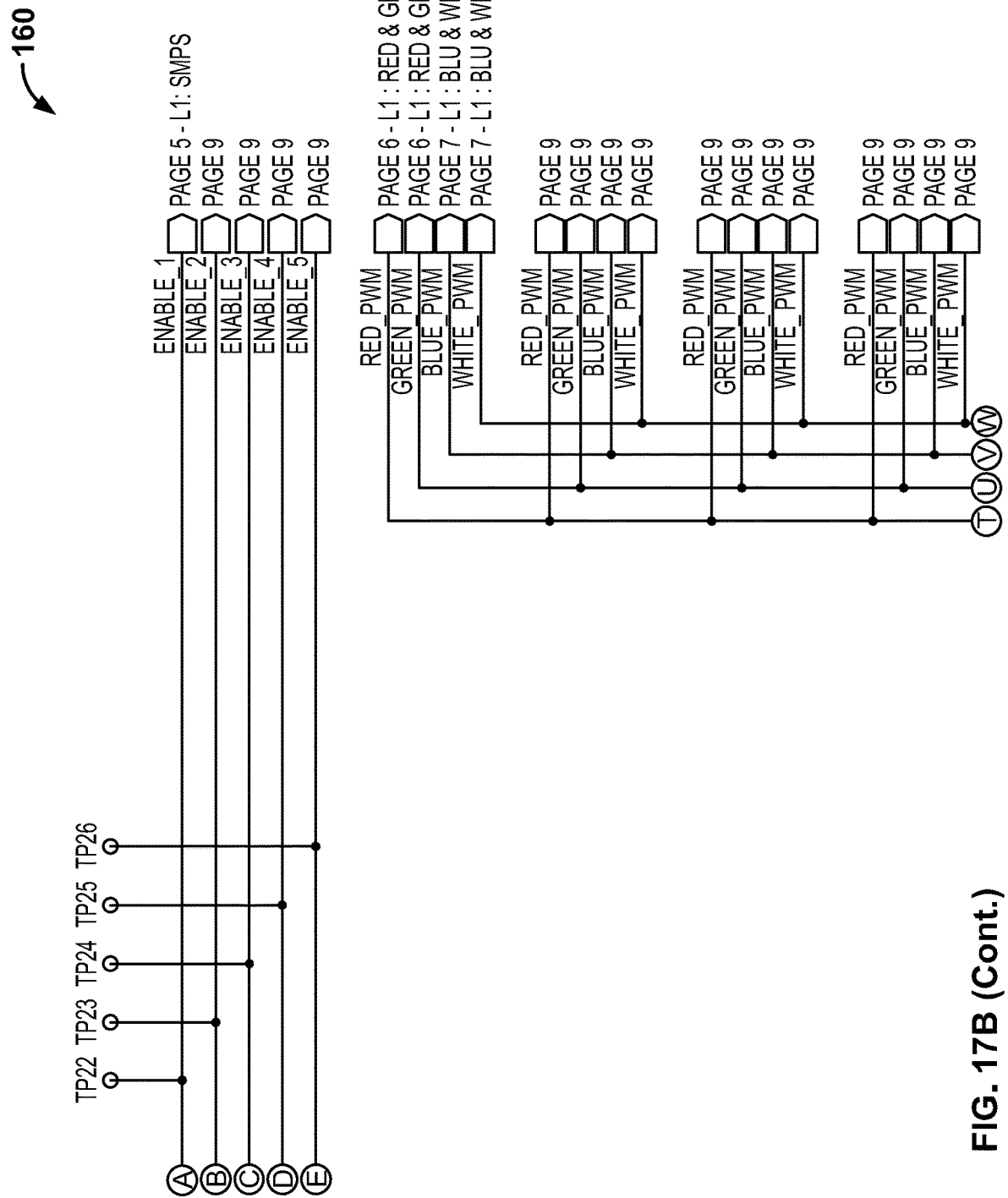
Figure 17B:
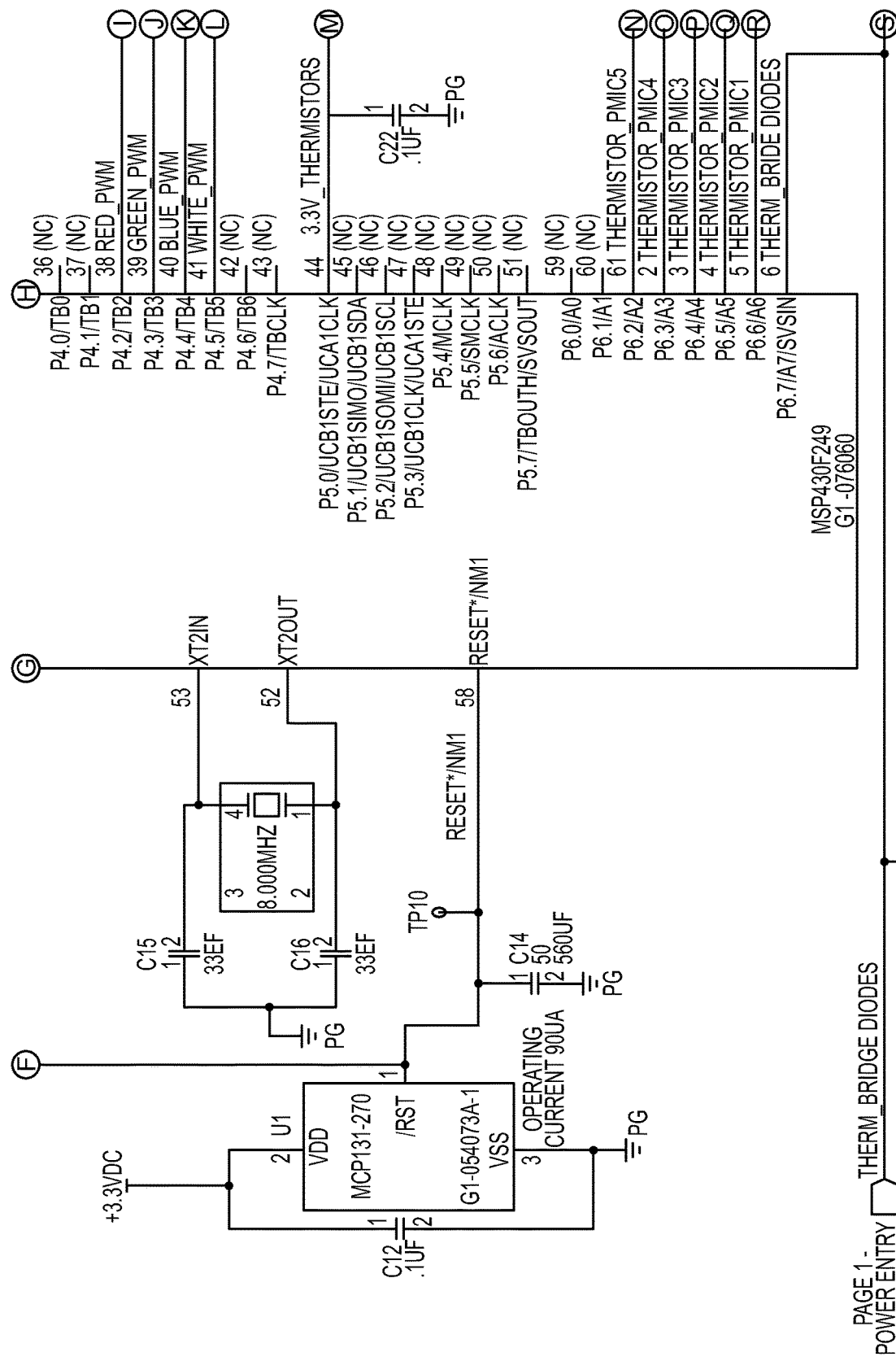
Figure 17B:
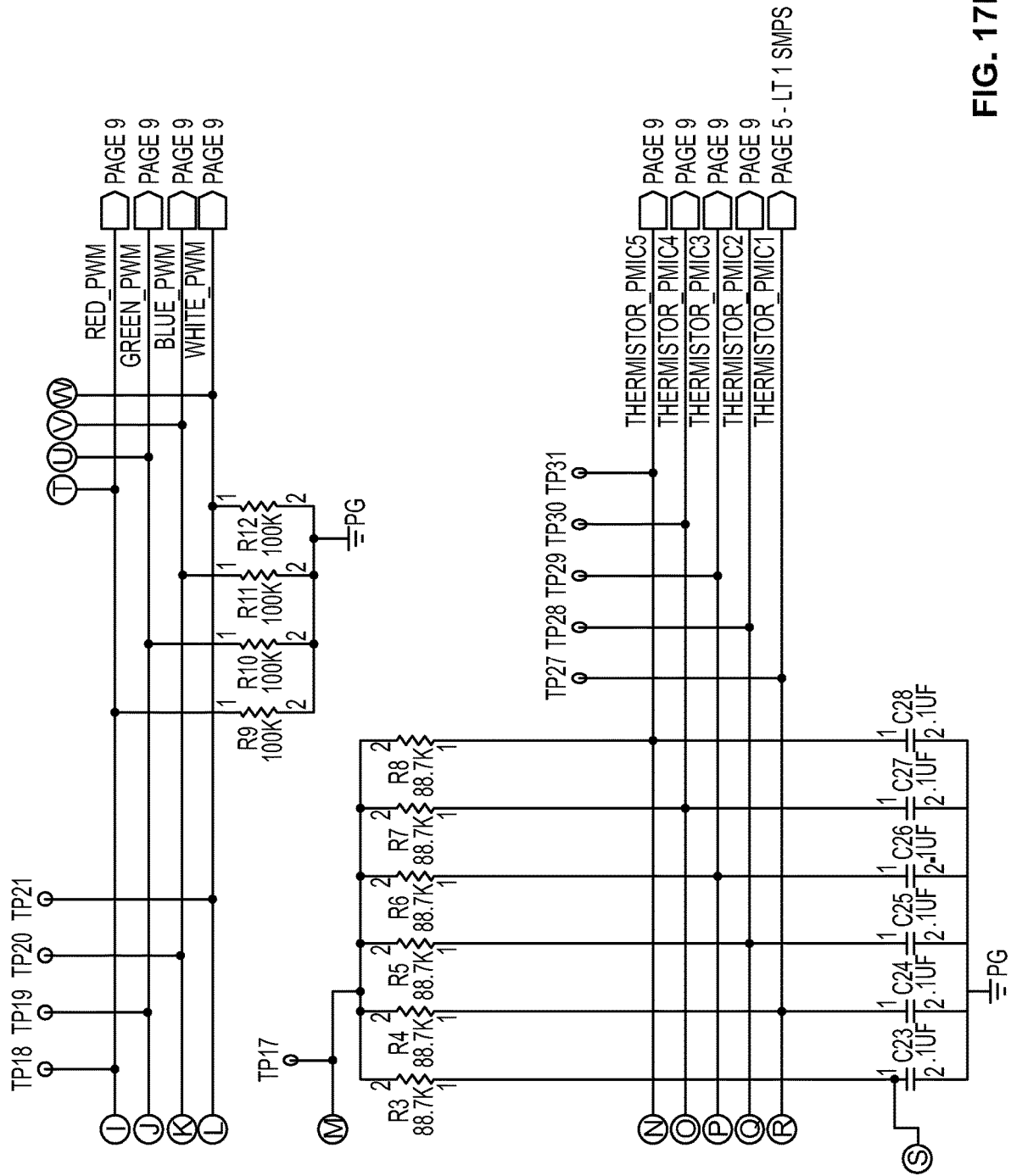

FIG. 17B is a schematic 160 illustrating the microcontroller 132 in greater detail. The MSP 430F249 microcontroller manufactured by Texas Instruments could be used, however, any suitable microcontroller chip could be used to create the pulse width modulation signals to control the plurality of LEDs 64 to create the desired "light" show. Power entry from the voltage divider 126 could be used as the input to P.10/TACLK/CAOUT, pin 12 of microcontroller 132. The I/O output pins 14-18 could provide the enable input for the fly-back converter 134 for each light 12 in the system. The I/O outputs 38-41 could provide the pulse width modulation signals for each color of the LEDs 64 associated with the system. For example, if RGBW LEDs are used, four pulse width modulation signals will be generated by the microcontroller 132, which will then branch off for each light 12 in the system. The pulse width modulation signals generated by microcontroller 132 will go the LED FET drivers 138, which will be discussed in greater detail below. The disclosure is not limited to the configuration of microcontroller 132 as shown in FIG. 17B.

Figure 17C:
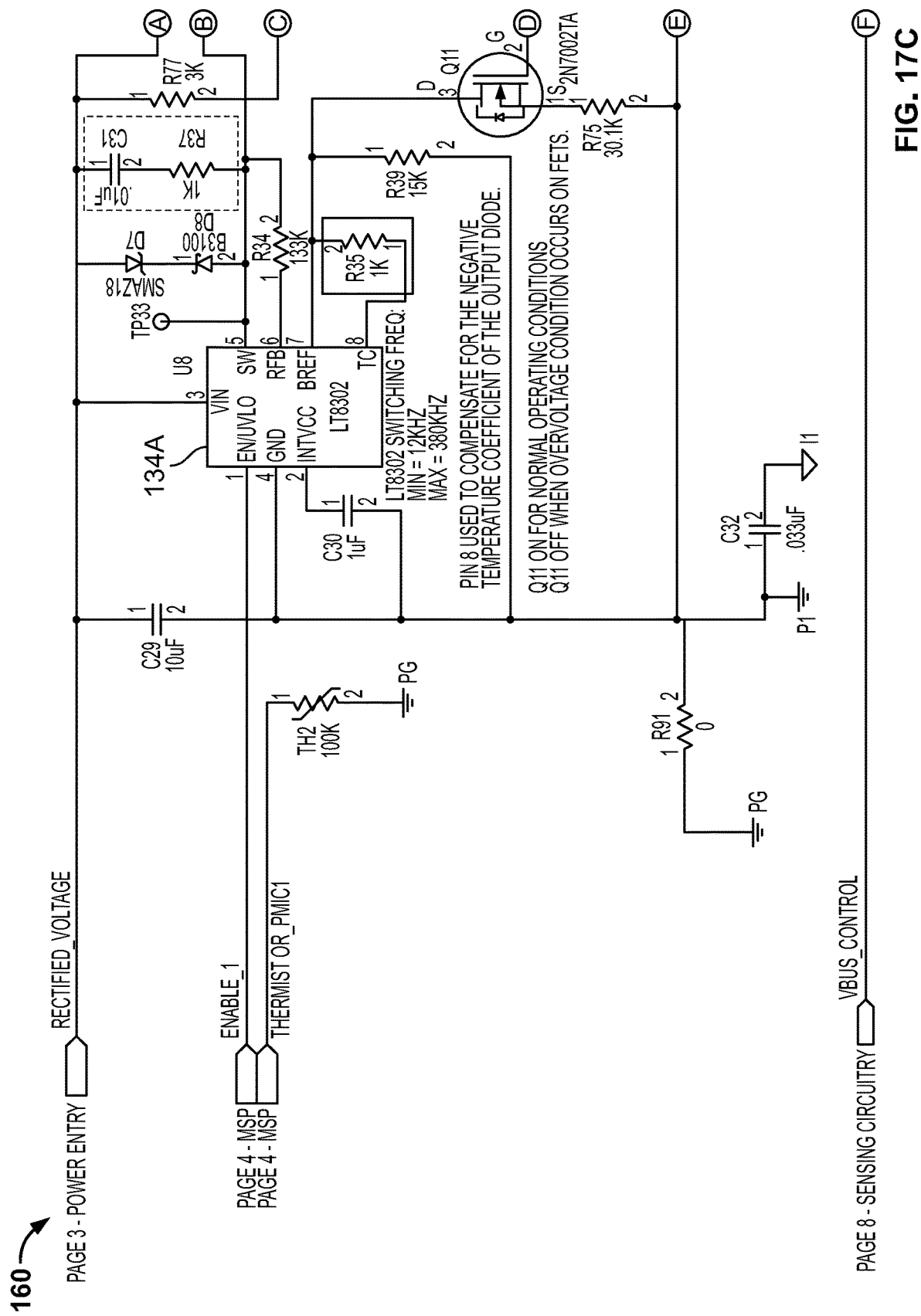
Figure 17C:
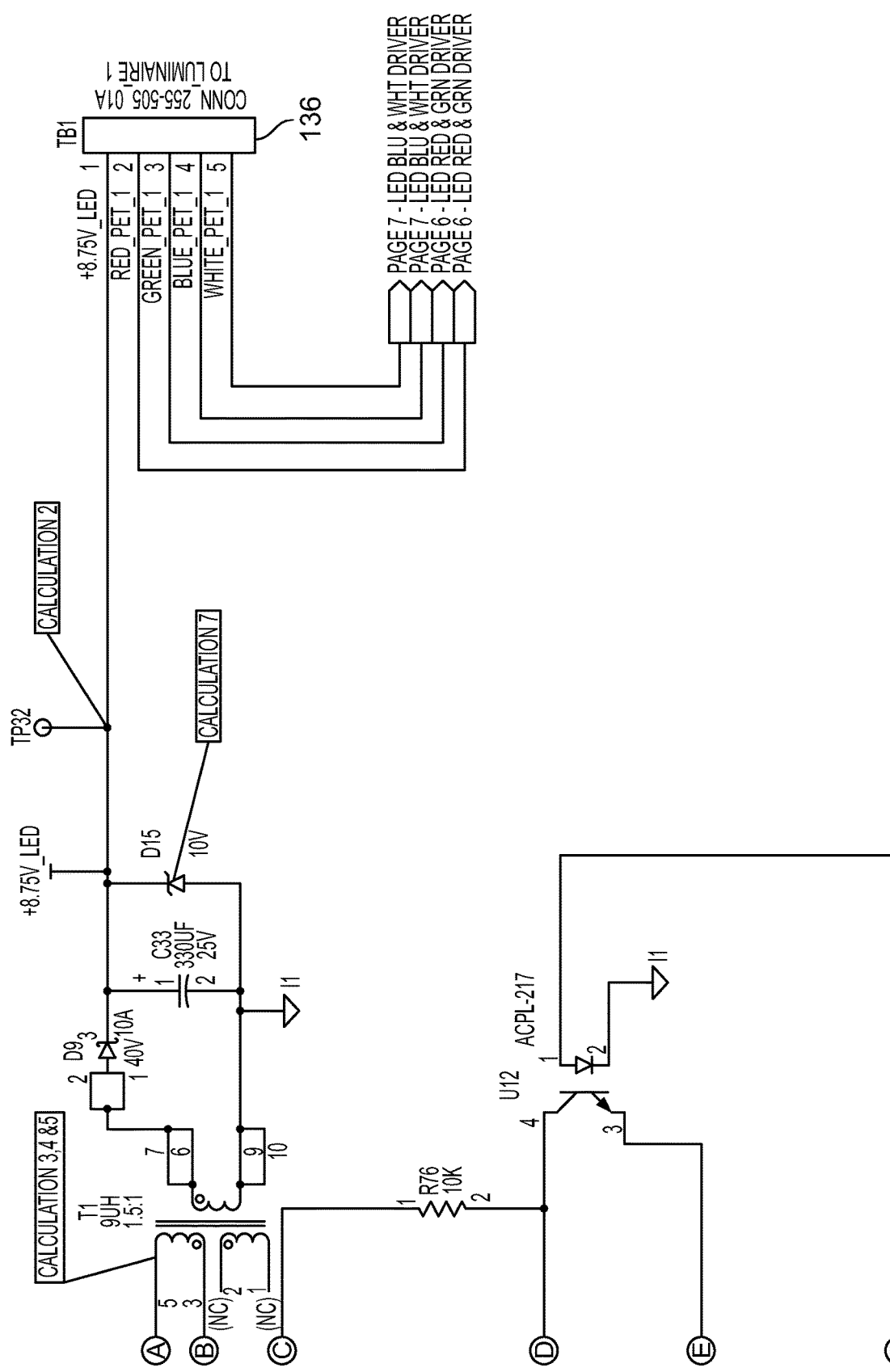

FIG. 17C is a schematic 160 showing the fly-back converter 134 and the connector to light 136. The fly-back converter 134 converts the rectified voltage from the bridge rectifier 128 to the necessary voltage supply for the LEDs 64. The fly-back converter 134 also adjusts the voltage to LEDs 64 based on the input from a voltage adjustor 144, which will be discussed in greater detail below. A transformer using inductors could be used in the design of fly-back converter 134 to achieve the necessary voltage to power LEDs 64. The inductors could have the necessary ratio of coil turns to produce the desired output voltage. Any suitable means other than a fly-back converter for converting and adjusting voltage may be used. The LT8302 chip manufactured by Linear Technology could be used in the circuitry for fly-back converter 134 to generate a signal related to the output voltage of the transformer. Alternatively, other suitable means for generating a signal related to the output voltage of the transformer may be used including, but not limited to, an optocoupler on the secondary circuit or a separate winding. Once the current on the primary circuit is disrupted on the fly-back converter 134, a diode on the secondary circuit is forward biased allowing the necessary voltage to the LED 64 through the connector to light 136. The connector to light 136 then provides return signals from the LEDs 64 corresponding to each color on the light 12. The LED 64 return signals are supplied to the LED FET driver 138, the remote temperature sensing module 140, and the remote SKU sensing module 142, which will be discussed in greater detail below.

Figure 17D:
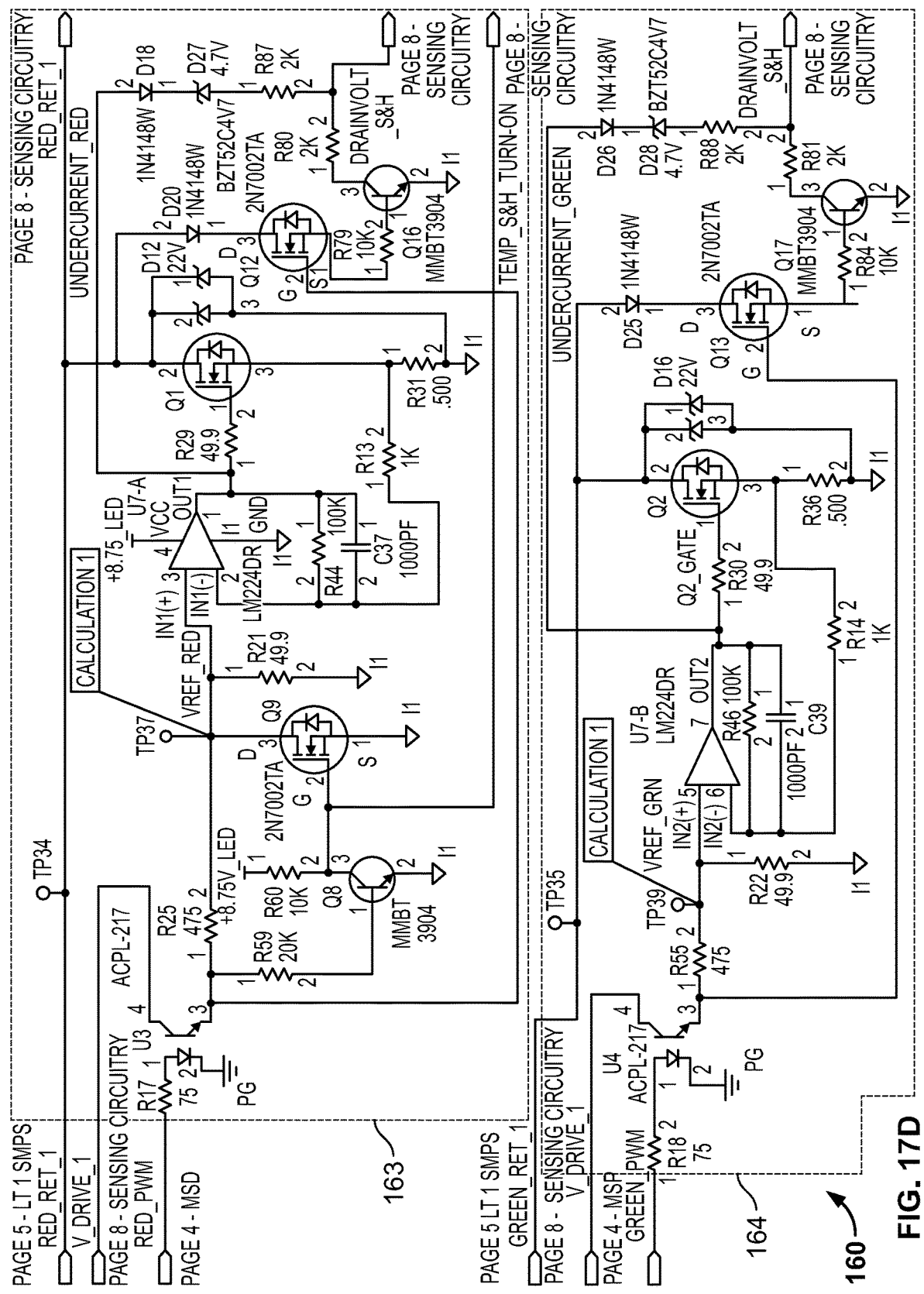
Figure 17E:
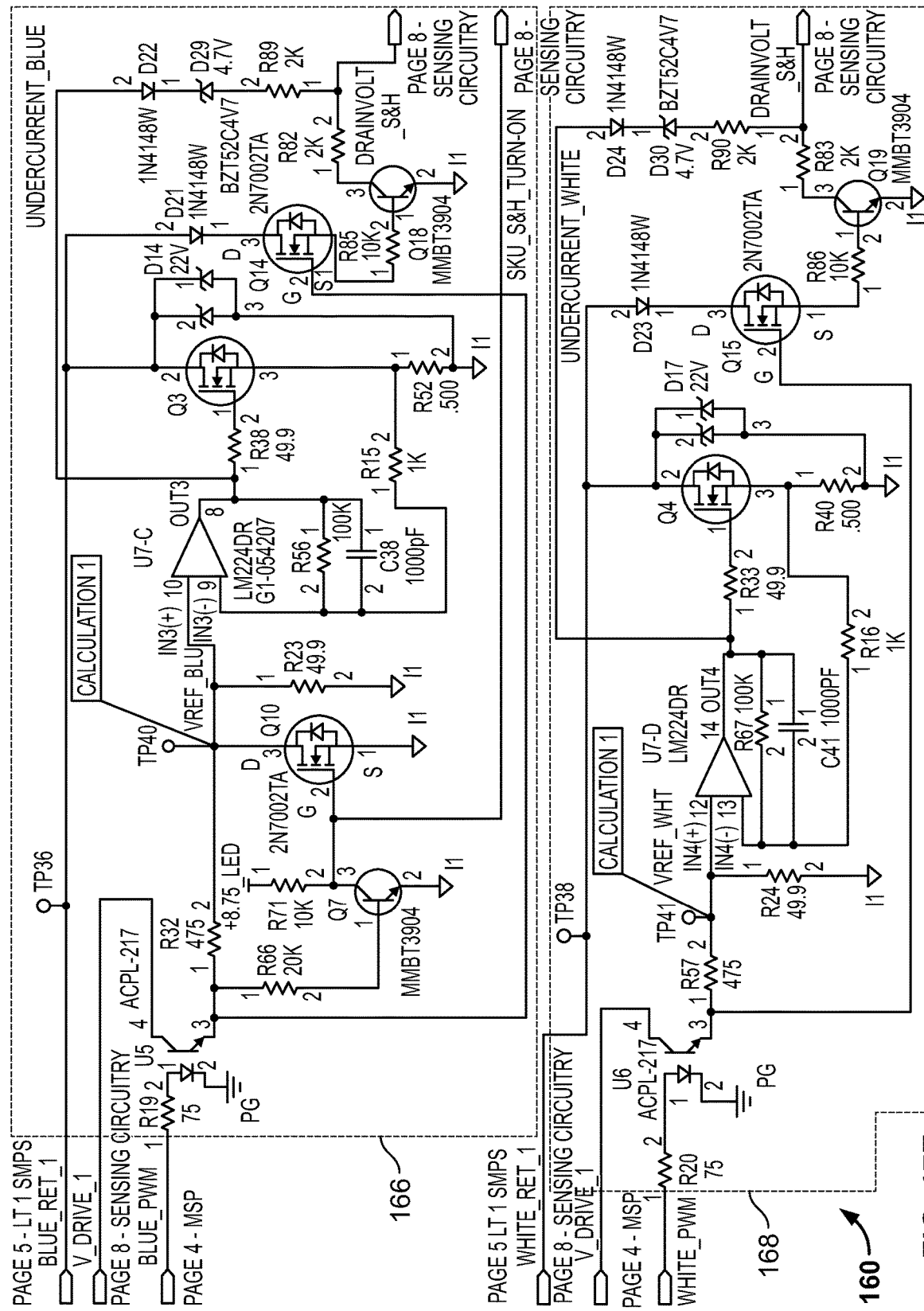

The LED FET driver 138 will now be described in greater detail. FIGS. 17D and 17E illustrates red/green LED driver schematics 163-164 and blue/white LED driver schematics 166-168 respectively. For the LED FET drivers 138, there is a pulse width modulation input signal that is generated by the microcontroller 132. This signal could be directed to an opto-isolator, which directs a transistor to allow the output from the remote temperature sensing module 140 and the remote SKU sensing module 142 into the LED FET driver 138 circuitry. The disclosure in the present application is not limited to using an opto-isolator and a transistor for this mechanism. Any other suitable means for receiving a pulse width modulation signal and allowing the LED FET driver 138 to operate based on that signal may be used. For the LED FET drivers 138, the output from the remote temperature sensing module 140 and the remote SKU sensing module 142 could be maintained by an op amp or other suitable means to provide the input to the voltage adjustor 144, which will be discussed in greater detail below. The return from each LED could be used to modify the load on the input signal to voltage adjustor 144 through the use of various transistors and resistors as shown in FIG. 17D. Furthermore, one LED FET driver 138 can generate an input signal to turn on the remote temperature sensing module 140 and another LED FET driver 138 can generate an input signal to turn on the remote SKU sensing module 142. The LED FET drivers 138 that generate these signals could correspond to the LEDs 64 that are connected to a thermistor and SKU sensing resistor, which will be described in greater detail below. These signals could be generated upon receiving a pulse width modulation signal from microcontroller 132.

Figure 17F:
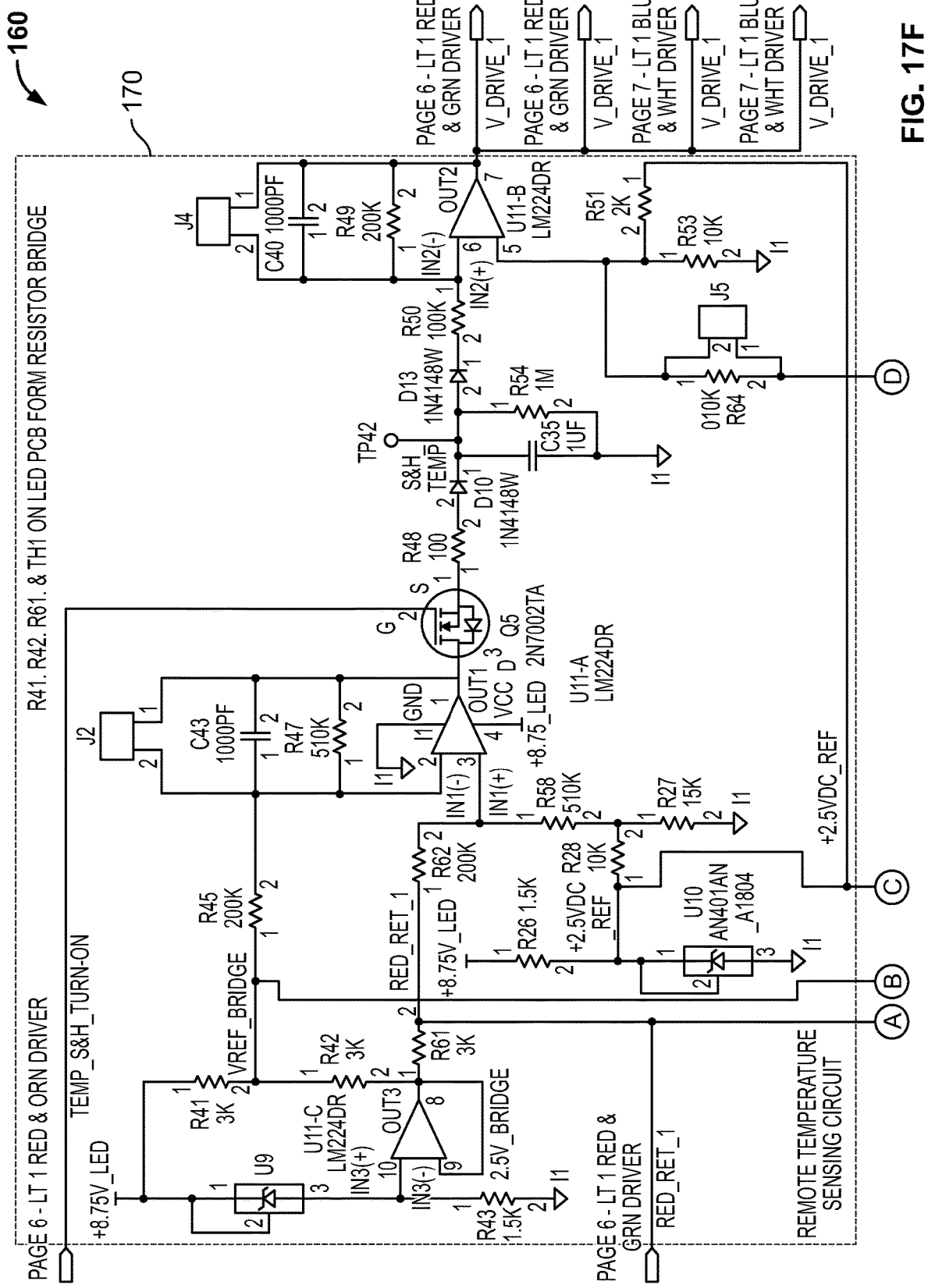
Figure 17F:
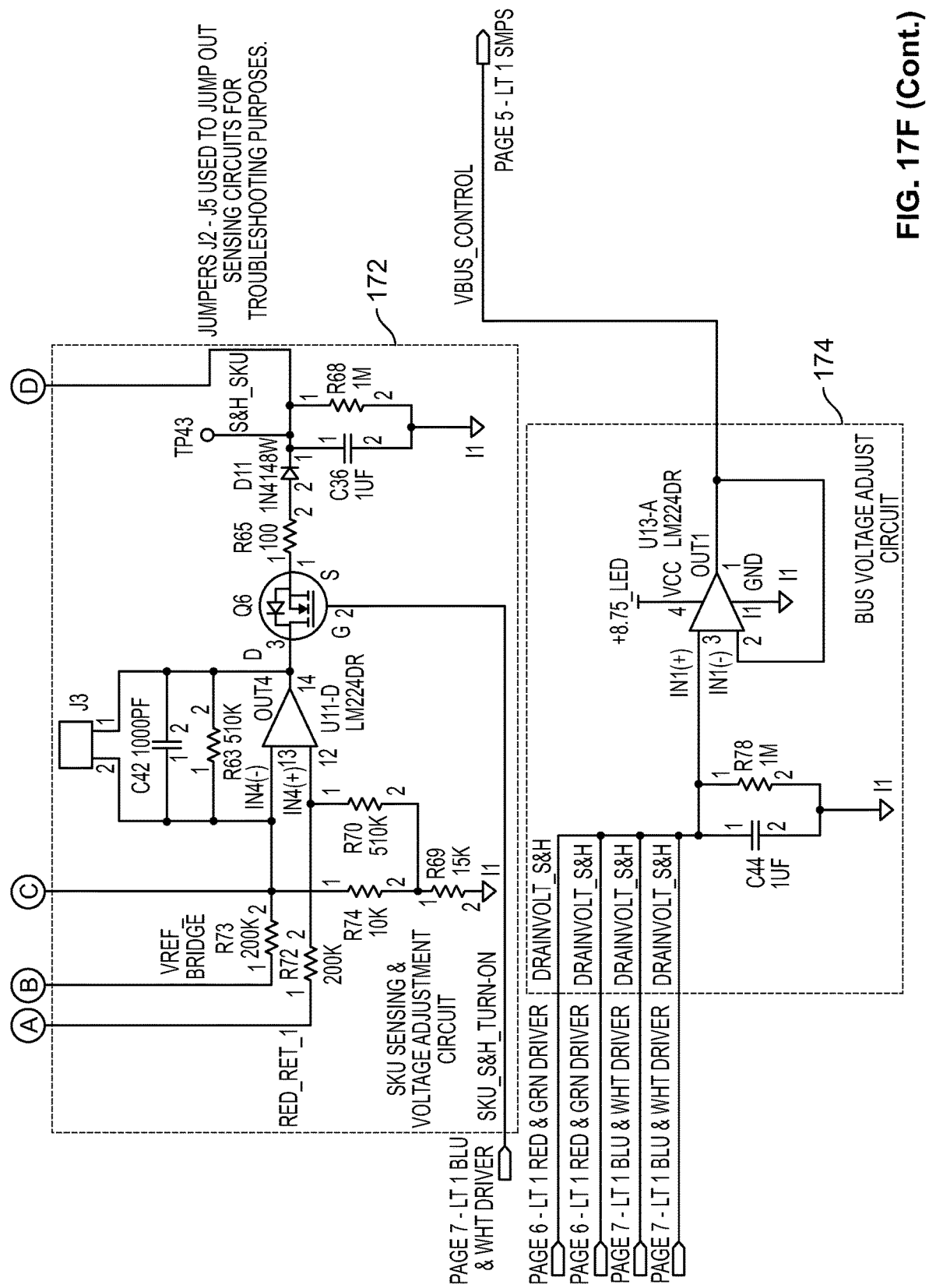

FIG. 17F shows the remote temperature sensing schematic 170 for remote temperature sensing module 140, remote SKU sensing schematic 172 for remote SKU sensing module 142, and voltage adjustor schematic 172 for voltage adjustor 144. The purpose of these circuits is to ensure the correct lights 12 are being used with the system (e.g., that the lights 12 are proprietary and/or were manufactured by a certain manufacturer). The input to the remote temperature sensing module 140 could come from an LED 64 connected to a thermistor. The input to the remote SKU sensing module 142 could come from another LED 64 connected to a resistor. These signals are the LED returns that come from the light 12 and the connector to light 136. The input signals generated by the LED FET drivers 138 are used to control a transistor or switch to allow the LED returns to generate the necessary output to control the LED FET drivers 138. The LED returns are controlled and amplified in order to generate an adequate operating signal for the LED FET driver 138. Any suitable mechanism for achieving the necessary output could be used in the present disclosure. The voltage adjustor 144 receives its input from the LED FET drivers 138 as discussed above. The output from the voltage adjustor 144 is directed to the fly-back converter 134 for adjusting the voltage to the connector to light 136 and ultimately the LEDs 64 in the light 12. The circuitry in the voltage adjustor 144 should generate the necessary signal to control the fly-back converter 134.

Figure 18A:
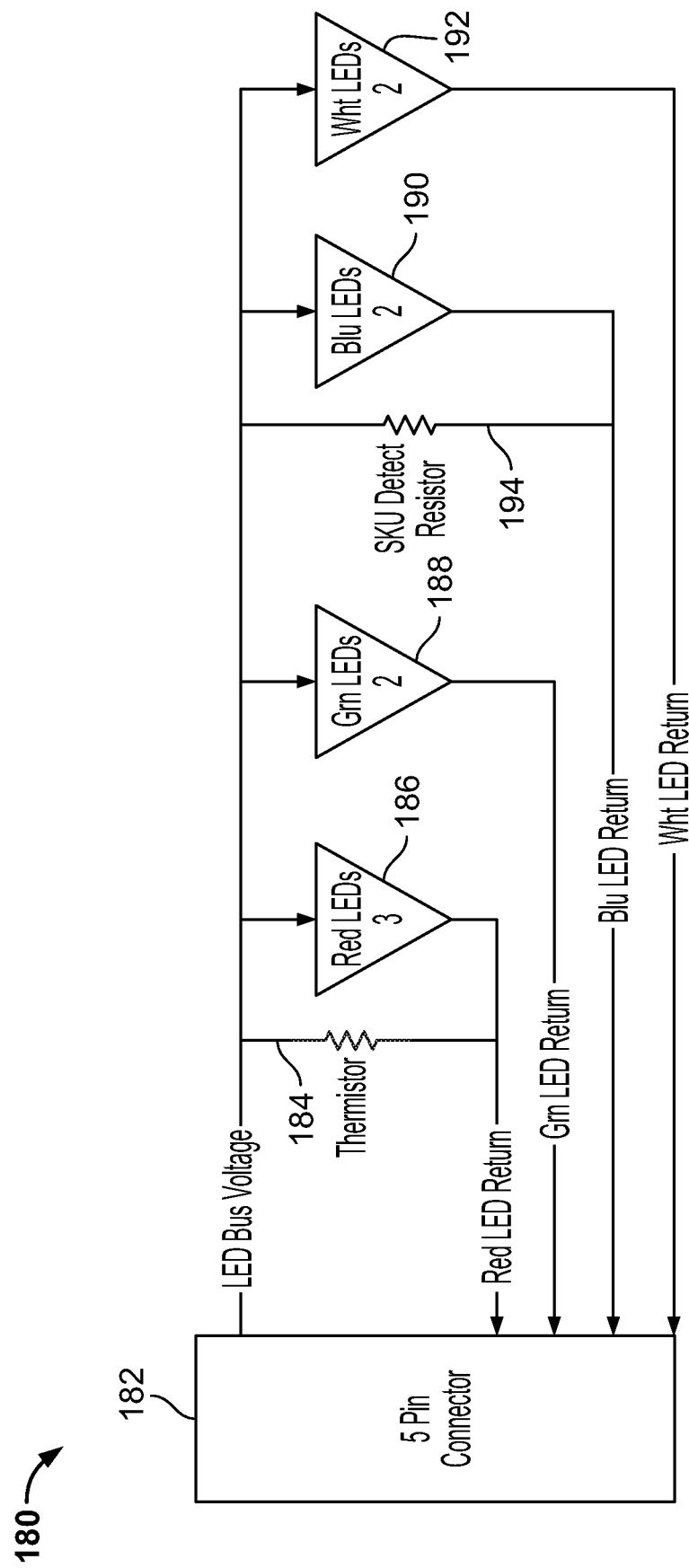
FIGS. 18A-18B are electrical schematic diagrams of the accent lights of the present disclosure.
Figure 18B:
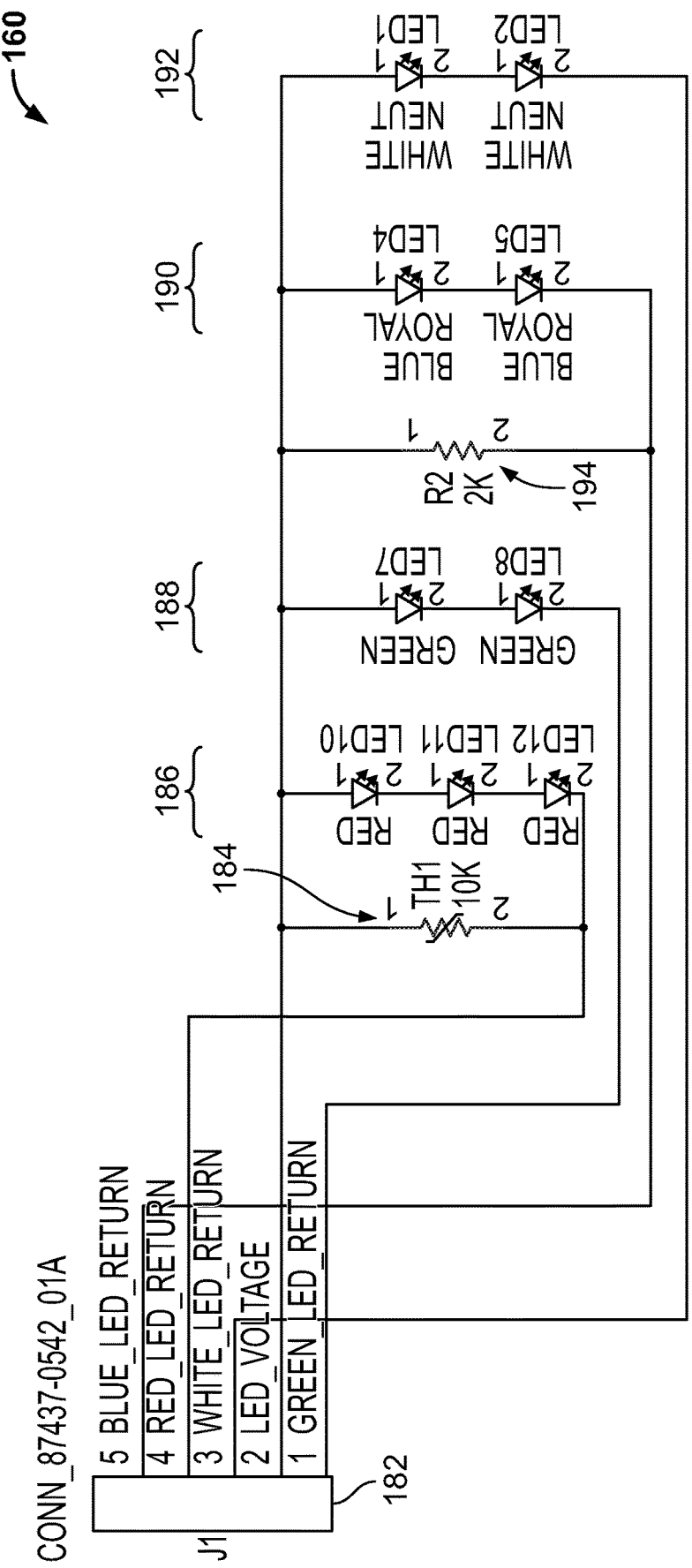

FIGS. 18A-18B show the LEDs 64 in greater detail. In particular, the LED schematic 180 includes an LED pin connector 182, a thermistor 184, a plurality of red LEDs 186, a plurality of green LEDs 188, a plurality of blue LEDs 190, a plurality of white LEDs 192, and a SKU resistor 194. The LEDs 64 receive its voltage from the fly-back converter 134. As shown in the drawings, the red LEDs 186 are connected to thermistor 184 in parallel, such that the return LED signals can provide the proper input to the remote temperature sensing module 140. Furthermore, the blue LEDs 190 are connected in parallel with the SKU resistor 194 to provide the proper input to the remote SKU sensing module 142.

Figure 19:
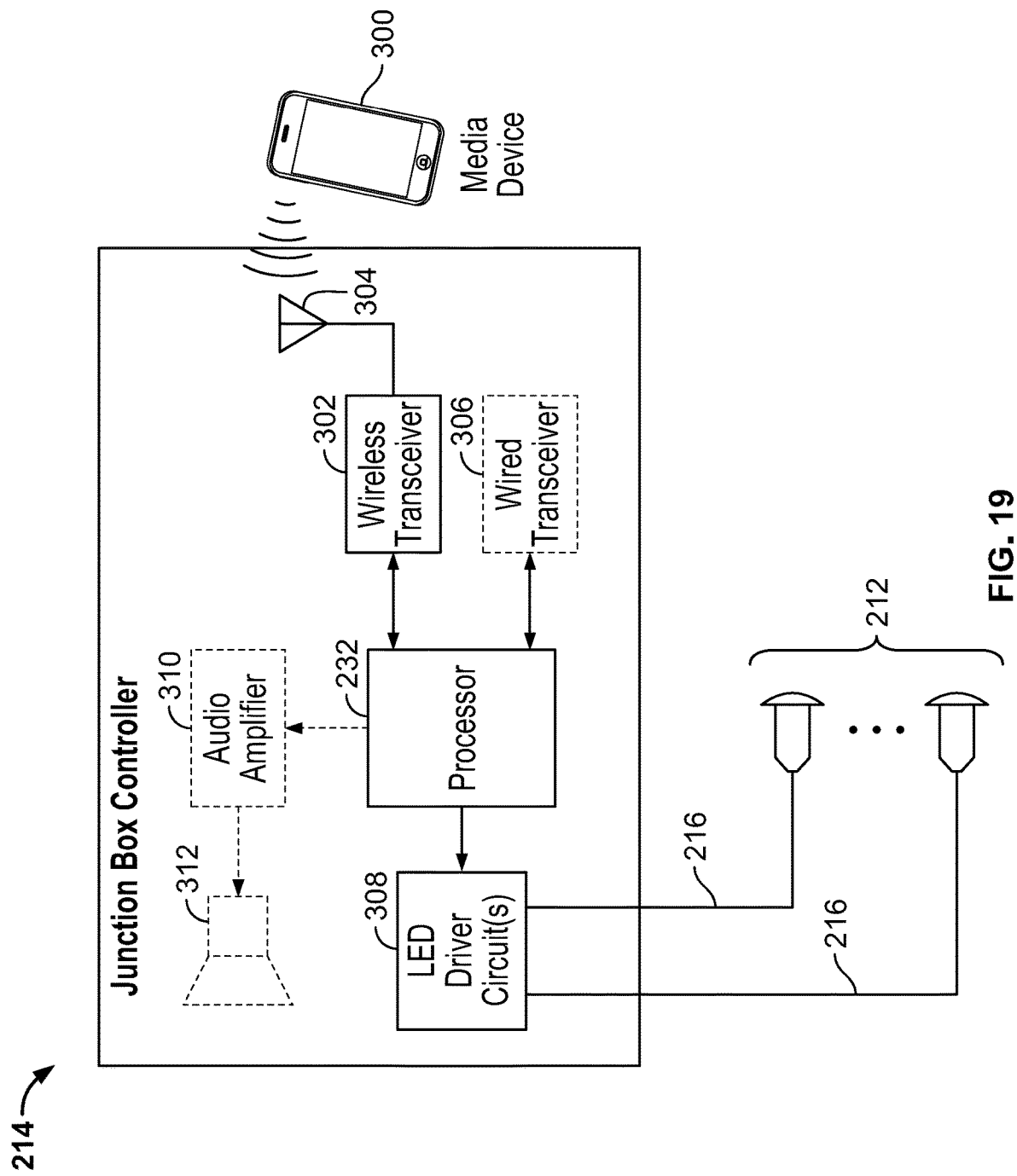
FIG. 19 is a block diagram illustrating hardware components of a second embodiment of the junction box controller.

FIG. 19 is a block diagram illustrating hardware components of a second embodiment of a junction box controller 214, wherein the junction box controller 214 includes the ability to receive an audio signal from an audio source and control output of the accent lights based on the received audio signal. The junction box controller 214 can include a processor 232. The processor 232 could include the microcontroller 132 described in connection with FIGS. 16-18 above. In particular, the processor 232 can be an MSP 430F249 microcontroller manufactured by Texas Instruments or any suitable microcontroller chip to create the pulse width modulation signals to control a plurality of lights 212 to create the desired "light" show, in response to received audio signals. The plurality of lights 212 could include lights 12 described above in connection with FIGS. 1-18B. The junction box controller 214 can receive an audio signal from a media device 300. The media device 300 can include, but is not limited to, a personal computer, desktop computer, laptop computer, smartphone, tablet, smartwatch, or any other device for generating an audio signal. The junction box controller 214 could take the form of the junction box controller 12 described above in connection with FIGS. 1-18B. The junction box controller 214 can receive the audio signal via a wireless transceiver 302 having an antenna 304. The Wireless communication can be accomplished through Bluetooth, WiFi, Zigbee, WiMAX, LTE, 3G, 4G or any other suitable wireless communication means. Optionally, the junction box controller 214 can include a wired transceiver 306 for receiving the audio signal from the media device 300 from a wired network connection. The wired transceiver 306 can communicate with the audio device 300 through a Ethernet connection, serial, fiber optic, coaxial, HDMI, USB or other suitable means. The junction box controller 214 can include LED driver circuits 308 for controlling the plurality of lights 212. The LED driving circuits 308 could include the LED driver circuits explained above in connection with FIGS. 16-18. The junction box controller 214 can optionally include an audio amplifier 310 for receiving an audio signal and processing the signal and transmitting it to a speaker 312 for playing the audio. Audio could also be streamed in parallel to another device such as a speaker. The speaker could also be external to the junction box controller 214 (e.g., one or more outdoor ("landscape") speakers near a pool/spa, etc.).

Figure 20:
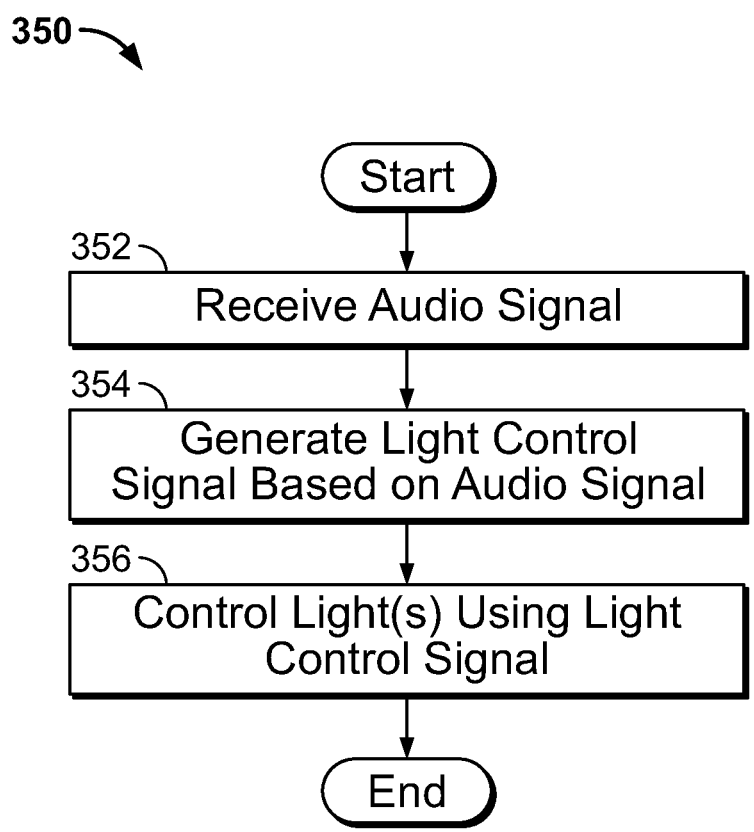
FIG. 20 is a flowchart illustrating processing steps for controlling accent lights based on an audio signal.

FIG. 20 is a flowchart illustrating processing steps 350 for controlling accent lights based on an audio signal. In step 352, the junction box controller 214 receives an audio signal from a media device 300. In step 354, the processor 232 generates a light control signal based on the audio signal received from the media device 300. In particular, the processor 232 can coordinate a "light show" based on the amplitude, wavelength, and/or frequency of the received audio signal. For example, the processor 232 can generate a light control signal to control the intensity and colors of the lights, lighting sequences and the duration of lighting, and/or activation and deactivation of light control programs based on the music type. Additionally, the processor 232 can extract a portion of the audio signal and generate a "light show" based on the portion of the audio signal extracted. In step 356, the junction box controller 214 can control the plurality of LED lights 212 using the light control signal generated by the processor 232.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

What is claimed is:

1. An underwater luminaire comprising:
   a heat sink;
   a flexible circuit board having a plurality of light emitting diodes mounted thereto, the flexible circuit board mounted to the heat sink and transferring heat from the light emitting diodes to the heat sink;
   a wiring harness for connecting the underwater luminaire to a cable;
   a housing having a lens positioned at one end;
   an end cap mounted to an opposite end of the housing, the housing and the end cap forming a waterproof enclosure for the heatsink, the flexible circuit board, the plurality of light emitting diodes, and the wiring harness; and
   a compressible ring for facilitating secure installation of the underwater luminaire in a conduit.

2. The underwater luminaire of claim 1, wherein the end cap includes a protrusion and the housing includes a notch for facilitating alignment between the end cap and the housing.

3. The underwater luminaire of claim 1, wherein the plurality of light emitting diodes includes red, green, blue and white light emitting diodes.

4. The underwater luminaire of claim 1, wherein the flexible circuit board is formed from a single flat piece of flexible circuit board material.

5. The underwater luminaire of claim 1, wherein the flexible circuit board is wrapped around a portion of the heatsink.

6. The underwater luminaire of claim 1, wherein the lens is positioned flush against the conduit and protrudes out from the conduit.

7. The underwater luminaire of claim 1, further comprising a spacer component mounted between the heat sink and the lens to facilitate proper fitting of the heat sink within the housing.

8. An underwater luminaire comprising:
   a heat sink;
   a flexible circuit board having a plurality of light emitting diodes mounted thereto, the flexible circuit board being mounted to a front face of the heat sink, wrapped underneath a rear face of the heat sink, and mounted to a rear face of the heat sink opposite the front face of the heat sink and transferring heat from the light emitting diodes to the heat sink;
   a wiring harness for connecting the underwater luminaire to a cable;
   a housing having a lens positioned at one end; and
   an end cap mounted to an opposite end of the housing, the housing and the end cap forming a waterproof enclosure for the heatsink, the flexible circuit board, the plurality of light emitting diodes, and the wiring harness.

9. The underwater luminaire of claim 8, wherein the end cap includes a protrusion and the housing includes a notch for facilitating alignment between the end cap and the housing.

10. The underwater luminaire of claim 8, wherein the plurality of light emitting diodes includes red, green, blue and white light emitting diodes.

11. The underwater luminaire of claim 8, wherein the flexible circuit board is formed from a single flat piece of flexible circuit board material.

12. The underwater luminaire of claim 8, further comprising a compressible ring for facilitating secure installation of the underwater luminaire in a conduit.

13. The underwater luminaire of claim 12, wherein the lens is positioned flush against the conduit and protrudes out from the conduit.

14. The underwater luminaire of claim 8, further comprising a spacer component mounted between the heat sink and the lens to facilitate proper fitting of the heat sink within the housing.

* * * * *